United States Patent
Sakikawa et al.

(10) Patent No.: US 10,539,334 B2
(45) Date of Patent: Jan. 21, 2020

(54) HYGROSCOPIC MATERIAL AND DEHUMIDIFIER USING SAME

(71) Applicants: Sharp Kabushiki Kaisha, Sakai, Osaka (JP); THE SCHOOL CORPORATION KANSAI UNIVERSITY, Suita-shi, Osaka (JP)

(72) Inventors: Nobuki Sakikawa, Sakai (JP); Takashi Miyata, Suita (JP); Kazuya Matsumoto, Suita (JP)

(73) Assignees: SHARP KABUSHIKI KAISHA, Sakai (JP); THE SCHOOL CORPORATION KANSAI UNIVERSITY, Osaka (JP)

( * ) Notice: Subject to any disclaimer, the term of this patent is extended or adjusted under 35 U.S.C. 154(b) by 113 days.

(21) Appl. No.: 15/503,787

(22) PCT Filed: Oct. 27, 2015

(86) PCT No.: PCT/JP2015/080237
§ 371 (c)(1),
(2) Date: Feb. 14, 2017

(87) PCT Pub. No.: WO2016/068129
PCT Pub. Date: May 6, 2016

(65) Prior Publication Data
US 2017/0276380 A1  Sep. 28, 2017

(30) Foreign Application Priority Data
Oct. 29, 2014 (JP) .................................. 2014-220847

(51) Int. Cl.
*F24F 1/02* (2011.01)
*F24F 3/14* (2006.01)
(Continued)

(52) U.S. Cl.
CPC ............ *F24F 3/1423* (2013.01); *B01D 53/26* (2013.01); *B01D 53/263* (2013.01); *B01D 53/28* (2013.01);
(Continued)

(58) Field of Classification Search
CPC .......... F24F 3/1423; F24F 1/02; F24F 3/1411; F24F 2003/144; F24F 2203/1032;
(Continued)

(56) References Cited

U.S. PATENT DOCUMENTS 6,254,990 B1 * 7/2001 Ishizaki ..................... C08J 3/12
428/402
9,382,407 B2 * 7/2016 Park ........................ A43B 13/04
(Continued)

FOREIGN PATENT DOCUMENTS

CN 101282777 A 10/2008
JP 05-301014 A 11/1993
(Continued)

OTHER PUBLICATIONS

Dhara et al., "Volume Phase Transition in Interpenetrating Networks of Poly(N-isopropylacrylamide) with Gelatin", Langmuir, American Chemical Society, vol. 16, Jan. 15, 2000, pp. 2424-2429.
(Continued)

*Primary Examiner* — Melvin Jones
(74) *Attorney, Agent, or Firm* — Keating & Bennett, LLP

(57) ABSTRACT

The present invention achieves a moisture absorbing material which enables efficient dehumidification without supercooling or large heat quantity; and a dehumidifier in which the moisture absorbing material is used. The moisture absorbing material can be a dried product of a polymer gel in which an interpenetrating polymer network structure or a semi-interpenetrating polymer network structure is formed by (a) a stimuli-responsive polymer whose affinity with
(Continued)

water changes reversibly in response to an external stimulus and (b) a hydrophilic polymer.

7 Claims, 16 Drawing Sheets

(51) Int. Cl.
    *B01D 53/26* (2006.01)
    *B01J 20/24* (2006.01)
    *B01D 53/28* (2006.01)
    *C08L 101/00* (2006.01)
    *B01J 20/26* (2006.01)
    *C08L 101/14* (2006.01)
    *B01J 20/28* (2006.01)

(52) U.S. Cl.
    CPC ............. *B01J 20/24* (2013.01); *B01J 20/262* (2013.01); *B01J 20/264* (2013.01); *B01J 20/267* (2013.01); *B01J 20/28011* (2013.01); *B01J 20/28047* (2013.01); *C08L 101/00* (2013.01); *C08L 101/14* (2013.01); *F24F 1/02* (2013.01); *B01D 2253/202* (2013.01); *B01D 2259/4508* (2013.01); *B01D 2259/80* (2013.01); *B01D 2259/802* (2013.01); *B01J 2220/44* (2013.01); *F24F 3/1411* (2013.01); *F24F 2003/144* (2013.01); *F24F 2203/1032* (2013.01)

(58) Field of Classification Search
    CPC .............................. B01D 53/26; B01D 53/263; B01D 2253/202; B01D 2259/4508; B01D 2259/80; B01D 2259/802; B01J 20/24; B01J 20/262; B01J 20/264; B01J 20/267; B01J 20/28011; B01J 20/28047
    See application file for complete search history.

(56) References Cited

U.S. PATENT DOCUMENTS

| | | | | |
|---|---|---|---|---|
| 2003/0020199 | A1* | 1/2003 | Kajikawa | B29B 9/12 264/140 |
| 2004/0121017 | A1* | 6/2004 | Ishii | C08J 3/075 424/487 |
| 2006/0179549 | A1* | 8/2006 | Huggins | A41B 11/004 2/239 |
| 2009/0264845 | A1* | 10/2009 | Himori | C09D 133/26 604/367 |
| 2009/0275470 | A1* | 11/2009 | Nagasawa | A61F 13/53 502/402 |
| 2009/0314160 | A1 | 12/2009 | Meijer | |

FOREIGN PATENT DOCUMENTS

| | | |
|---|---|---|
| JP | 2001-259349 A | 9/2001 |
| JP | 2002-310485 A | 10/2002 |
| JP | 2003-144833 A | 5/2003 |
| JP | 2005-034838 A | 2/2005 |
| JP | 2009-511261 A | 3/2009 |
| JP | 2010-054184 A | 3/2010 |

OTHER PUBLICATIONS

Official Communication issued in Chinese Patent Application No. 201580043707.3, dated Dec. 11, 2018.

Changjun, Liu et al.; "Preparation and Property of Chitosan/Poly(N-Isopropylacrylamide) Fully Interpenetrating Network Hydrogel"; Journal of Functional Polymers; Jun. 2011, No. 6; vol. 27; pp. 166-169.

\* cited by examiner

HYGROSCOPIC MATERIAL AND DEHUMIDIFIER USING SAME

TECHNICAL FIELD

The present invention relates to (i) a moisture absorbing material and (ii) a dehumidifier in which a moisture absorbing material is used.

BACKGROUND ART

Dehumidifying devices and humidity control devices are typified by two types: a refrigeration cycle system and a zeolite system. The refrigeration cycle system includes a compressor, and is a system in which indoor air is dehumidified by causing moisture in the air to condense through cooling the indoor air with the use of an evaporator (see, for example, Patent Literature 1). The zeolite system uses a rotor obtained by processing, into the form a rotor, a moisture absorbing porous material such as zeolite. Specifically, in the zeolite system, (i) the rotor is made to absorb moisture in indoor air, (ii) the rotor, which has thus absorbed the moisture, is exposed to hot air generated by an electric heater, so that the moisture in the rotor is taken out as high-temperature, high-humidity air, and (iii) the high-temperature, high-humidity air is cooled by indoor air, so that the moisture in the high-temperature, high-humidity air is condensed and therefore the indoor air is dehumidified (see, for example, Patent Literature 2 and 3). Furthermore, a system, in which respective characteristics of a refrigeration cycle system and a zeolite system are combined, is also used (see, for example, Patent Literature 4). Furthermore, a so-called desiccant air conditioning system, in which air conditioning such as an cooling operation is carried out by causing an adsorbent (e.g. silica gel, activated carbon, zeolite) to adsorb and desorb moisture, has become prevalent as a large-scale air conditioning system. Demands for protection of global environment have caused active development of highly efficient humidity control systems (see, for example, Patent Literature 5 and 6).

CITATION LIST

Patent Literature

[Patent Literature 1]
Japanese Patent Application Publication Tokukai No. 2002-310485 (Publication date: Oct. 23, 2002)

[Patent Literature 2]
Japanese Patent Application Publication Tokukai No. 2001-259349 (Publication date: Sep. 25, 2001)

[Patent Literature 3]
Japanese Patent Application Publication Tokukai No. 2003-144833 (Publication date: May 20, 2003)

[Patent Literature 4]
Japanese Patent Application Publication Tokukai No. 2005-34838 (Publication date: Feb. 10, 2005)

[Patent Literature 5]
Japanese Patent Application Publication Tokukaihei No. 5-301014 (Publication date: Nov. 16, 1993)

[Patent Literature 6]
Japanese Patent Application Publication Tokukai No. 2010-54184 (Publication date: Mar. 11, 2010)

SUMMARY OF INVENTION

Technical Problem

However, such conventional technologies are insufficient in terms of efficient dehumidification without supercooling or large heat quantity.

Specifically, a refrigeration cycle system still poses problems such as (i) the use of halogen-based gas which leads to environmental destruction, (ii) the tendency to cause a dehumidifying device or a humidity control device to be large in size for installation of a compressor, and (iii) loud noise. Meanwhile, a zeolite system requires regenerated heat of 200° C. or higher, and is therefore inefficient. A hybrid type, which is obtained by combining the refrigeration cycle system and the zeolite system, has made an improvement such as using part of compression heat of a compressor for recycling of a zeolite rotor. This allows the zeolite system to be used for a wider range of purposes. However, a complex air pathway and a complex mechanism are necessary, and it is therefore impossible to avoid causing a dehumidifying device or a humidity control device to be large in size. Furthermore, the fact that water vapor, which has been collected by adsorption or the like, is condensed by supersaturation cooling has not been changed.

Furthermore, even a desiccant air conditioning system requires large heat quantity for adsorbing and desorbing moisture.

The present invention has been made in view of the problems, and it is an object of the present invention to achieve (i) a moisture absorbing material which enables efficient dehumidification without supercooling or large heat quantity and (ii) a dehumidifier in which the moisture absorbing material is used.

Solution to Problem

In order to attain the object, a moisture absorbing material in accordance with an embodiment of the present invention includes: a dried product of a polymer gel, the polymer gel including a stimuli-responsive polymer whose affinity with water changes reversibly in response to an external stimulus and a hydrophilic polymer, and the stimuli-responsive polymer and the hydrophilic polymer forming an interpenetrating polymer network structure or a semi-interpenetrating polymer network structure.

In order to attain the object, a dehumidifier in accordance with an embodiment of the present invention includes: the moisture absorbing material; and a stimulus applying section for applying an external stimulus to the moisture absorbing material.

Advantageous Effects of Invention

A moisture absorbing material in accordance with an embodiment of the present invention is thus configured to include: a dried product of a polymer gel, the polymer gel including a stimuli-responsive polymer whose affinity with water changes reversibly in response to an external stimulus and a hydrophilic polymer, and the stimuli-responsive polymer and the hydrophilic polymer forming an interpenetrating polymer network structure or a semi-interpenetrating polymer network structure. Therefore, in a case where the moisture absorbing material is used as a dehumidifying material, it is advantageously possible to efficiently carry out dehumidification without supercooling or large heat quantity.

A dehumidifier in accordance with an embodiment of the present invention thus includes the moisture absorbing material; and a stimulus applying section for applying a stimulus to the moisture absorbing material. Therefore, it is advantageously possible to efficiently carry out dehumidification without supercooling or large heat quantity.

DESCRIPTION OF EMBODIMENTS

Figure 1:
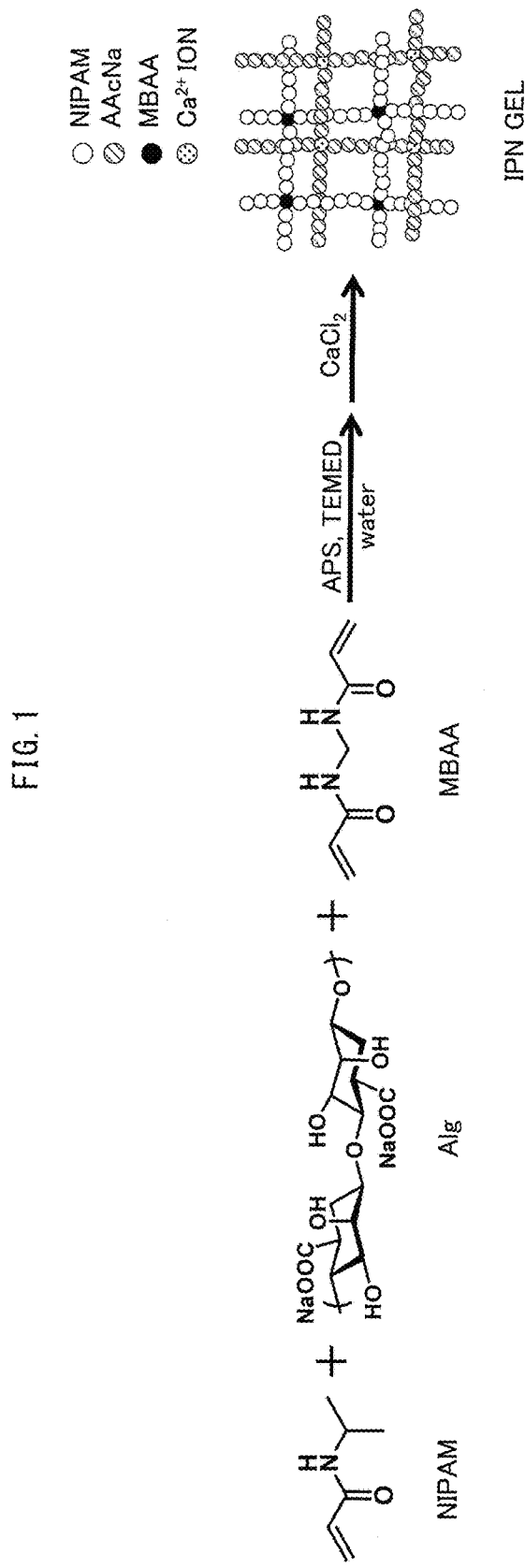
FIG. 1 is a view illustrating (i) a polymer gel included in a moisture absorbing material in accordance with an embodiment of the present invention and (ii) a method of producing the polymer gel.

The following description will discuss an embodiment of the present invention in detail. Note that term "A to B" representing a numerical range herein means "equal to or greater than A and equal to or less than B" unless specified otherwise. In addition, a substance which may mean any of "acrylic" or "methacrylic" will be written as "(meth) acrylic".

(I) Moisture Absorbing Material

As a result of diligent study to attain the object, the inventors of the present invention found that in a case where a dried product of a polymer gel, in which an interpenetrating polymer network structure or a semi-interpenetrating polymer network structure is formed by a stimuli-responsive polymer and a hydrophilic polymer, is used as a moisture absorbing material, dehumidification by a mechanism completely differing from those of conventional moisture absorbing materials can be efficiently carried out without supercooling or large heat quantity. The inventors of the present invention thus completed the present invention.

Specifically, the moisture absorbing material in accordance with an embodiment of the present invention is configured to include: a dried product of a polymer gel, the polymer gel including a stimuli-responsive polymer whose affinity with water changes reversibly in response to an external stimulus and a hydrophilic polymer, and the stimuli-responsive polymer and the hydrophilic polymer forming an interpenetrating polymer network structure or a semi-interpenetrating polymer network structure.

(Dried Product of Polymer Gel)

According to an embodiment of the present invention, a polymer gel refers to a polymer gel in which a three-dimensional network structure formed by crosslinking of a polymer has swelled as a result of absorbing a solvent such as water or an organic solvent.

According to an embodiment of the present invention, a dried product of a polymer gel is used as a moisture absorbing material. Note that "dried product of a polymer gel" herein refers to a product in which a solvent has been removed by drying of a polymer gel. Note that according to a dried product of a polymer gel in accordance with an embodiment of the present invention, a solvent does not need to be completely removed from a polymer gel, but can contain a solvent or water, provided that the polymer gel can absorb moisture in air. Therefore, a water content of a dried product of a polymer gel is not particularly limited, provided that the dried product can absorb moisture in air. For example, the water content is more preferably equal to or less than 40% by weight. Note that "water content" herein refers to a ratio of moisture to a dry weight of a polymer gel.

The polymer gel includes (i) a stimuli-responsive polymer whose affinity with water changes reversibly in response to an external stimulus and (ii) a hydrophilic polymer. The stimuli-responsive polymer and the hydrophilic polymer form an interpenetrating polymer network structure or a semi-interpenetrating polymer network structure.

Note that "interpenetrating polymer network structure" herein refers to a structure in which (i) polymers of differing types are each a crosslinked polymer and (ii) respective crosslinked networks of the polymers, while being independently present, are interlaced with each other without chemically bonding to each other. Note also that "semi-interpenetrating polymer network structure" refers to a structure in which (i) one of polymers of differing types is a crosslinked polymer, whereas the other one of the polymers of differing types is a linear polymer and (ii) the polymers, while being independently present, are interlaced with each other without chemically bonding to each other.

In the former case, (i) the stimuli-responsive polymer and the hydrophilic polymer are each a crosslinked polymer having a crosslinked network and (ii) the stimuli-responsive polymer and the hydrophilic polymer form a structure in which the respective crosslinked networks of the stimuli-responsive polymer and of the hydrophilic polymer are interlaced with each other without chemically bonding to each other, that is, an interpenetrating polymer network structure.

In the latter case, (i) one of the stimuli-responsive polymer and the hydrophilic polymer is a crosslinked polymer having a crosslinked network, whereas the other one is a linear polymer and (ii) the stimuli-responsive polymer and the hydrophilic polymer form a structure in which the stimuli-responsive polymer and the hydrophilic polymer are interlaced with each other without chemically bonding to each other, that is, a semi-interpenetrating polymer network structure.

(Stimuli-Responsive Polymer Whose Affinity with Water Changes Reversibly in Response to External Stimulus)

A stimuli-responsive polymer refers to a polymer whose property changes reversibly in response to an external stimulus. In an embodiment of the present invention, a stimuli-responsive polymer whose affinity with water changes reversibly in response to an external stimulus is used.

Examples of the external stimulus encompass, but are not particularly limited to, heat, light, electrical field, and pH.

Note that the concept "affinity with water changes reversibly in response to an external stimulus" means that a property of a polymer, which has been exposed to an external stimulus, changes reversibly between a hydrophilic property and a hydrophobic property in response to the external stimulus.

Of such stimuli-responsive polymers, a stimuli-responsive polymer whose affinity with water changes reversibly in response to heat, that is, a temperature-responsive polymer, can be used so as to reversibly carry out absorption of moisture in air and release of absorbed moisture by changing a temperature with the use of a simple heating device. This allows a temperature-responsive polymer to be suitably used particularly for a dehumidifier.

The temperature-responsive polymer is not limited to any particular one, provided that the temperature-responsive polymer has a lower critical solution temperature (LCST) (hereinafter also referred as "LCST"). A polymer having an LCST is hydrophilic at low temperatures and becomes hydrophobic at an LCST or higher. Note that "LCST" herein refers to a temperature which serves as a boundary between temperatures in a case where a polymer is dissolved. Specifically, the polymer is hydrophilic so as to be dissolved in water at a temperature lower than the temperature, whereas the polymer becomes hydrophobic so as to be insoluble in water at the temperature or higher.

More specific examples of the temperature-responsive polymer encompass: poly(N-alkyl(meth)acrylamide) such as poly(N-isopropyl(meth)acrylamide), poly(N-n-propyl (meth)acrylamide), poly(N-methyl(meth)acrylamide), poly (N-ethyl(meth)acrylamide), poly(N-n-butyl(meth)acrylamide), poly(N-isobutyl(meth)acrylamide), and poly(N-t-butyl (meth)acrylamide); poly(N-vinylalkylamide) such as poly (N-vinylisopropylamide), poly(N-vinyl n-propylamide), poly(N-vinyl n-butylamide), poly(N-vinylisobutylamide), and poly(N-vinyl-t-butylamide); poly(N-vinylpyrrolidone); poly(2-alkyl-2-oxazoline) such as poly(2-ethyl-2-oxazoline), poly(2-isopropyl-2-oxazoline), and poly(2-n-propyl-2-oxazoline); polyvinyl alkyl ethers such as polyvinyl methyl ether and polyvinyl ethyl ether; a copolymer of polyethylene oxide and polypropylene oxide; poly(oxyethylene vinyl ether); cellulose derivatives such as methyl cellulose, ethyl cellulose, hydroxypropyl cellulose, and hydroxypropyl methyl cellulose; and copolymers of the above polymers. In a case where the temperature-responsive polymer is a cellulose derivative, there is no need to carry out polymerization. This allows production of a moisture absorbing material to be easy. A cellulose derivative is also safe and biodegradable. A cellulose derivative therefore has such an advantage as being small in terms of environmental impact. In a case where the cellulose derivative is a hydroxypropyl cellulose, the hydroxypropyl cellulose preferably has an average molecular weight of 2,000 to 2000,000, and preferably has a substitution degree of 1 to 3. The temperature-responsive polymer is more preferably a crosslinked product obtained by crosslinking any of these polymers.

Note that according to an embodiment of the present invention, the stimuli-responsive polymer and the hydrophilic polymer form an interpenetrating polymer network structure or a semi-interpenetrating polymer network structure. Therefore, at least one of the stimuli-responsive polymer and the hydrophilic polymer is a crosslinked product.

In a case where a temperature-responsive polymer is a crosslinked product, examples of the crosslinked product encompass polymers obtained by polymerizing, in the presence of a crosslinking agent, (i) monomers such as: N-alkyl (meth)acrylamides such as N-isopropyl(meth)acrylamide, N-n-propyl(meth)acrylamide, N-methyl(meth)acrylamide, N-ethyl(meth)acrylamide, N-n-butyl(meth)acrylamide, N-isobutyl(meth)acrylamide, and N-t-butyl(meth)acrylamide; N-vinylalkylamides such as N-vinylisopropylamide, N-vinyl n-propylamide, N-vinyl n-butylamide, N-vinylisobutylamide, and N-vinyl-t-butylamide; vinyl alkyl ethers such as vinyl methyl ether and vinyl ethyl ether; ethylene oxide and propylene oxide; and 2-alkyl-2-oxazolines such as 2-ethyl-2-oxazoline, 2-isopropyl-2-oxazoline, and 2-n-propyl-2-oxazoline and (ii) two or more kinds of these monomers.

The crosslinking agent can be selected as appropriate from conventionally known crosslinking agents. Examples of a suitable crosslinking agent encompass: crosslinkable monomers having polymerizable functional groups, such as ethylene glycoldi(meth)acrylate, propylene glycoldi(meth) acrylate, N,N'-methylenebis(meth)acrylamide, tolylene diisocyanate, divinylbenzene, and polyethylene glycoldi(meth) acrylate; glutaraldehyde; polyvalent alcohol; polyvalent amine; polyvalent carboxylic acid; and metal ions such as calcium ions and zinc ions. These crosslinking agents can be used alone, or two or more kinds of these crosslinking agents can be used in combination.

In the case where a temperature-responsive polymer is a crosslinked product, the crosslinked product can be obtained by forming a network structure through reacting, with the crosslinking agent, a non-crosslinked temperature-responsive polymer such as the temperature-responsive polymers exemplified above.

Examples of a stimuli-responsive polymer whose affinity with water changes reversibly in response to light encompass (i) light-responsive polymers, whose hydrophilicity or polarity changes in response to light, such as an azobenzene derivative and a spiropyran derivative, (ii) a copolymer of any of the light-responsive polymers and at least one of a temperature-responsive polymer and a pH-responsive polymer, (iii) crosslinked products of the light-responsive polymers, and (iv) a crosslinked product of the copolymer.

Examples of a stimuli-responsive polymer whose affinity with water changes reversibly in response to an electrical field encompass (i) polymers having dissociable groups such as a carboxyl group, a sulfonic group a phosphate group, and an amino group, (ii) polymers in which complexes are formed by electrostatic interactions or hydrogen bonds, such as a complex of a carboxyl group-containing polymer and an amino group-containing polymer, and (iii) crosslinked products of these.

Examples of a -responsive polymer whose affinity with water changes reversibly in response to pH encompass (i) polymers having dissociable groups such as a carboxyl group, a sulfonic group a phosphate group, and an amino group, (ii) polymers in which complexes are formed by electrostatic interactions or hydrogen bonds, such as a complex of a carboxyl group-containing polymer and an amino group-containing polymer, and (iii) crosslinked products of these.

A molecular weight of the stimuli-responsive polymer is, although not limited to any particular amount, preferably equivalent to a number average molecular weight of equal to or greater than 3000, which number average molecular weight is determined by use of gel permeation chromatography (GPC).

(Hydrophilic Polymer)

A hydrophilic polymer for use in the moisture absorbing material in accordance with an embodiment of the present invention is not limited to any particular one, provided that the hydrophilic polymer is different from a stimuli-responsive polymer with which the hydrophilic polymer forms an interpenetrating polymer network structure or a semi-interpenetrating polymer network structure.

Examples of the hydrophilic polymer encompass polymers whose side chain or main chain has a hydrophilic group such as a hydroxyl group, a carboxyl group, a sulfonic group, a phosphate group, or an amino group. More specific examples of the hydrophilic polymer encompass: (i) polysaccharides such as alginic acid and hyaluronic acid, (ii) chitosan, (iii) cellulose derivatives such as carboxymethyl cellulose, methyl cellulose, ethyl cellulose, and hydroxyethyl cellulose, (iv) poly(meth)acrylic acid, polymaleic acid, polyvinyl sulfonic acid, polyvinyl benzenesulfonic acid, polyacrylamide alkyl sulfonate, polydimethyl aminopropyl (meth)acrylamide, (v) copolymers of (iii) and (meth)acrylamide, hydroxyethyl(meth)acrylate, (meth)acrylic acid alkyl ester and the like, (vi) a complex of polydimethyl aminopropyl(meth)acrylamide and polyvinyl alcohol, (vii) a complex of polyvinyl alcohol and poly(meth)acrylic acid, and (viii) poly(meth)acrylonitrile, polyallylamine, polyvinyl alcohol, polyethylene glycol, polypropylene glycol, poly (meth)acrylamide, poly-N,N'-dimethyl(meth)acrylamide, poly-2-hydroxyethyl methacrylate, poly-alkyl(meth)acrylate, polydimethyl aminopropyl(meth)acrylamide, poly (meth)acrylonitrile, and copolymers of the above polymers. The hydrophilic polymer is more preferably a crosslinked product of any of these.

According to an embodiment of the present invention, a stimuli-responsive polymer and a hydrophilic polymer form an interpenetrating polymer network structure or a semi-interpenetrating polymer network structure. Therefore, at least one of the stimuli-responsive polymer and the hydrophilic polymer is a crosslinked product.

In a case where the hydrophilic polymer is a crosslinked product, examples of the crosslinked product encompass polymers obtained by polymerizing, in the presence of a crosslinking agent, monomers such as (meth)acrylic acid, allylamine, vinyl acetate, (meth)acrylamide, N,N'-dimethyl (meth)acrylamide, 2-hydroxyethyl methacrylate, alkyl (meth)acrylate, maleic acid, vinyl sulfonic acid, vinyl benzenesulfonic acid, acrylamide alkyl sulfonate, dimethylaminopropyl(meth)acrylamide, and (meth)acrylonitrile.

The crosslinking agent can be selected as appropriate from conventionally known crosslinking agents. Examples of a suitable crosslinking agent encompass: crosslinkable monomers having polymerizable functional groups, such as ethylene glycoldi(meth)acrylate, propylene glycoldi(meth) acrylate, N,N'-methylenebis(meth)acrylamide, tolylene diisocyanate, divinylbenzene, and polyethylene glycoldi(meth) acrylate; glutaraldehyde; polyvalent alcohol; polyvalent amine; polyvalent carboxylic acid; and metal ions such as calcium ions and zinc ions. These crosslinking agents can be used alone, or two or more kinds of these crosslinking agents can be used in combination.

In the case where the hydrophilic polymer is a crosslinked product, the crosslinked product can be a crosslinked product obtained by forming a network structure through reacting the non-crosslinked hydrophilic polymer with the crosslinking agent. Examples of the non-crosslinked hydrophilic polymer encompass: a polymer, which is obtained by polymerizing any of the monomers, or polysaccharide, such as alginic acid or hyaluronic acid; chitosan; and cellulose derivatives such as carboxymethyl cellulose, methyl cellulose, ethyl cellulose, and hydroxyethyl cellulose.

A molecular weight of the hydrophilic polymer is, although not limited to any particular amount, preferably equivalent to a number average molecular weight of equal to or greater than 3000, which number average molecular weight is determined by use of GPC.

(Moisture Absorbing Material)

Conventionally, a stimuli-responsive gel, which repeats swelling and shrinking in response to an external stimulus in a solvent, is known. However, even if a dried product of such a stimuli-responsive gel is used as a moisture absorbing material, ability to absorb moisture in air is insufficient. Examples of a material known for being highly moisture absorbing encompass: salts such as sodium hydroxide; and water-absorbent polymers. However, salts such as sodium hydroxide solate along with moisture absorption. This demands a moisture absorbing material which does not become deformed. In a case where a water-absorbent polymer is used, it is necessary to vaporize moisture in order to separate the moisture from the moisture absorbing material.

The present invention is based on the findings that a dried product of a polymer gel, in which a stimuli-responsive polymer whose affinity with water changes reversibly in response to an external stimulus and a hydrophilic polymer form an interpenetrating polymer network structure or a semi-interpenetrating polymer network structure, has (i) a stimuli-responsive polymer function to change, in response to an external stimulus, between (a) a state in which to absorb moisture and (b) a state in which to release absorbed moisture and (ii) high moisture absorption performance.

Therefore, in a case where a dried product of the polymer gel is used as a moisture absorbing material, the moisture absorbing material, which has merely absorbed moisture in air and received an external stimulus, becomes hydrophobic so as to release the absorbed moisture. Unlike conventional moisture absorbing materials, therefore, it is unnecessary to evaporate the absorbed moisture by applying a large heat quantity, and it is thus possible to directly extract the absorbed moisture as water in liquid form. For example, assume a case where (i) the stimuli-responsive polymer is a temperature-responsive polymer and (ii) an LCST of the temperature-responsive polymer is, for example, a relatively low temperature of 40° C. or higher which is substantially higher than room temperature. In such a case, unlike conventional dehumidifiers, it is possible to extract absorbed moisture from the moisture absorbing material merely by heating the moisture absorbing material to the LCST or higher without supercooling or large heat quantity.

Note that a phenomenon that a dried product of a polymer gel adsorbs and absorbs moisture in air (water vapor) is scholarly referred to as sorption. However, the main focus of the present invention is to cause, by applying an external stimulus to a dried product, the dried product to release moisture which was absorbed into the dried product. Therefore, (i) a phenomenon that moisture in air is absorbed into a dried product will be hereinafter referred to as "moisture absorption" or "absorption of moisture" and (ii) a phenomenon that water in liquid form is released as a water droplet as a result of application of an external stimulus will be hereinafter referred to as "release of water (moisture)" or "dehydration".

Note that in a case where (i) a polymer gel contains (a) a stimuli-responsive polymer whose affinity with water changes reversibly in response to an external stimulus and (b) a hydrophilic polymer and (ii) the polymer gel is obtained by copolymerizing the stimuli-responsive polymer and the hydrophilic polymer, it is not possible to bring about the advantageous effect of the present invention. As demonstrated in Comparative Example described later, a polymer gel obtained by copolymerizing a temperature-responsive polymer and a hydrophilic polymer loses such a property of a temperature-responsive gel as drastically changing from being hydrophilic to being hydrophobic at a certain temperature. Therefore, according to a moisture absorbing material which is a dried product of a polymer gel obtained by copolymerizing a stimuli-responsive polymer and a hydrophilic polymer, performance to release absorbed moisture deteriorates. Furthermore, according to a polymer gel (demonstrated in Comparative Example described later) obtained by copolymerizing a temperature-responsive polymer and a hydrophilic polymer, copolymerizing the hydrophilic polymer in an amount of 70% by weight causes the polymer gel to lose a property to change from being hydrophilic to being hydrophobic in response to temperature.

With the moisture absorbing material in accordance with an embodiment of the present invention, affinity with moisture changes reversibly in response to an external stimulus. This allows absorption of moisture by a moisture absorbing material and release of absorbed moisture to be repeated. It is therefore possible to repeatedly use the moisture absorbing material.

There is no particular limitation to a ratio between the stimuli-responsive polymer and the hydrophilic polymer which are included in the polymer gel. However, in terms of a ratio of weights excluding a weight of a crosslinking agent, the hydrophilic polymer included relative to the stimuli-responsive polymer is (i) more preferably equal to or greater than 5% by weight and even more preferably equal to or greater than 20% by weight and (ii) more preferably equal to or less than 1000% by weight and even more preferably equal to or less than 700% by weight.

The moisture absorbing material in accordance with an embodiment of the present invention is not limited to any particular shape, but can have a shape of any of a plate, a sheet, a film, and particles. In a case where the moisture absorbing material has a shape of particles, the shape of the moisture absorbing material is not particularly limited. For example, the moisture absorbing material can have a substantially spherical shape or a plate-like shape. The moisture absorbing material in accordance with an embodiment of the present invention is also not limited to any particular size. The size of the moisture absorbing material can be selected as appropriate according to a configuration of a dehumidifier.

The polymer gel can include (i) a stimuli-responsive polymer whose affinity with water changes reversibly in response to an external stimulus and (ii) a hydrophilic polymer. Note, however, that the polymer gel can further include a polymer, provided that the advantageous effect of the present invention is not adversely affected.

(II) Method of Producing Moisture Absorbing Material

A moisture absorbing material production method in accordance with an embodiment of the present invention can include: a polymer gel producing step of producing a polymer gel which includes a stimuli-responsive polymer and a hydrophilic polymer, the stimuli-responsive polymer and the hydrophilic polymer forming an interpenetrating polymer network structure or a semi-interpenetrating polymer network structure; and a drying step of drying the polymer gel thus obtained in the polymer gel producing step. The moisture absorbing material production method in accordance with an embodiment of the present invention can further include a crushing step of crushing a dried product of the polymer thus obtained in the drying step.

(Polymer Gel Producing Step)

The polymer gel producing step is not particularly limited, provided that the polymer gel can be produced. For example, the polymer gel can be produced by the following methods:

[1] A method including the steps of:

(i) forming a crosslinked network (a) of a crosslinked product of the stimuli-responsive polymer by polymerizing and crosslinking monomers which constitute the stimuli-responsive polymer; and (ii) forming an interpenetrating polymer network structure by polymerizing and crosslinking, in the presence of the crosslinked network (a), monomers which constitute the hydrophilic polymer, the interpenetrating polymer network structure being formed by the crosslinked network (a) and a crosslinked network (b) of a crosslinked product of the hydrophilic polymer.

[2] A method including the steps of:

(i) forming a crosslinked network (a) of a crosslinked product of the stimuli-responsive polymer by polymerizing and crosslinking monomers which constitute the stimuli-responsive polymer; and (ii) forming a semi-interpenetrating polymer network structure by polymerizing, in the presence of the crosslinked network (a), monomers which constitute the hydrophilic polymer, the semi-interpenetrating polymer network structure being formed by the crosslinked network (a) and the hydrophilic polymer which is linear.

[3] A method including the steps of:

(i) producing, by polymerizing monomers which constitute the stimuli-responsive polymer, the stimuli-responsive polymer which is linear; and (ii) forming a semi-interpenetrating polymer network structure by polymerizing and crosslinking, in the presence of the stimuli-responsive polymer which is linear, monomers which constitute the hydrophilic polymer, the semi-interpenetrating polymer network structure being formed by the stimuli-responsive polymer and a crosslinked network (b) of a crosslinked product of the hydrophilic polymer.

In any of the methods [1] through [3], a method of polymerizing monomers is not particularly limited, and can be any suitable one of radical polymerization, ion polymerization, polycondensation, ring-opening polymerization, and the like. A solvent to be used in the method of polymerizing monomers is also not limited to any particular one, and can be selected as appropriate according to the monomers. Examples of the suitable solvent encompass water, phosphate buffer, Tris buffer, acetic acid buffer, methanol, and ethanol.

A polymerization initiator is also not limited to any particular one. Examples of the suitable polymerization initiator encompass (i) persulfates such as ammonium persulfate and sodium persulfate, (ii) hydrogen peroxide, (iii) peroxides such as t-butyl hydroperoxide and cumene hydroperoxide, (iv) azobisisobutyronitrile, and (v) benzoyl peroxide. Of these polymerization initiators, in particular, initiators exhibiting oxidation nature, such as persulfates and peroxides, can each be used as a redox initiator in combination with sodium hydrogen sulfite, N,N,N',N'-tetramethylethylene diamine, or the like. Alternative examples of the polymerization initiator encompass light and radiation.

A polymerization temperature is ordinarily 5° C. to 80° C. although not particularly limited. A polymerization time is ordinarily 4 hours to 48 hours although not particularly limited.

Monomer concentrations, crosslinking agent concentrations, and the like during the polymerization are not particularly limited, provided that the stimuli-responsive polymer, the hydrophilic polymer and crosslinked products of these can be obtained. The polymerization initiator concentrations are also not particularly limited, and can be decided as appropriate.

In any of the methods [1] through [3], a method, in which a crosslinked network of a crosslinked product of the stimuli-responsive polymer or the hydrophilic polymer is formed by polymerizing and crosslinking monomers, can be (i) a method in which the monomers are polymerized in the presence of a crosslinking agent or (ii) a method in which the monomers are polymerized so as to be a polymer which is then crosslinked with the use of a crosslinking agent.

In the step (ii) of any of the methods [1] through [3], polymerization conditions or crosslinking conditions can be decided as appropriate so that no crosslinking is formed between polymers formed in the step (i) or between crosslinked products formed in the step (i).

In any of the methods [1] through [3], the monomers constituting the stimuli-responsive polymer, the monomers constituting the hydrophilic polymer, and the crosslinking agent are as described in the item (I) above.

In a case where the stimuli-responsive polymer or the hydrophilic polymer is in the first place already a polymer such as a cellulose derivative, a polysaccharide, or the like, (i) "by polymerizing and crosslinking monomers which constitute the stimuli-responsive polymer" can instead read "by crosslinking the stimuli-responsive polymer" in any of the methods [1] through [3] and (ii) "by polymerizing and crosslinking monomers which constitute the hydrophilic polymer" can instead read "by crosslinking the hydrophilic polymer" in any of the methods [1] through [3].

In any of the methods [1] through [3], the stimuli-responsive polymer or the crosslinked product thereof is produced, and then the hydrophilic polymer or the crosslinked product thereof is produced in the presence of the stimuli-responsive polymer or the crosslinked product thereof. Alternatively, it is possible that the hydrophilic polymer or the crosslinked product thereof is first produced, and then the stimuli-responsive polymer or the crosslinked product thereof is produced in the presence of the hydrophilic polymer or the crosslinked product thereof.

In any of the methods [1] through [3], an interpenetrating polymer network structure or a semi-interpenetrating polymer network structure is produced in two steps such that (i) the stimuli-responsive polymer or the crosslinked product thereof is produced and then (ii) the hydrophilic polymer or the crosslinked product thereof is produced in the presence of the stimuli-responsive polymer or the crosslinked product thereof. Alternatively, the stimuli-responsive polymer or the crosslinked product thereof and the hydrophilic polymer or the crosslinked product thereof can be simultaneously produced in a single step if polymerization conditions or crosslinking conditions are decided such that no crosslinking is formed between the stimuli-responsive polymer or the crosslinked product thereof and the hydrophilic polymer or the crosslinked product thereof. For example, the polymer gel can be produced in a single step if a combination of the polymerization method and the crosslinking agent for producing the hydrophilic polymer or the crosslinked product thereof differs from a combination of the polymerization method and the crosslinking agent for producing the hydrophilic polymer or the crosslinked product thereof.

(Drying Step)

In the drying step, the polymer gel obtained in the polymer gel producing step is dried so that a dried product of the polymer gel is obtained.

A method of drying the polymer gel is not particularly limited, and can be any conventionally well-known method which is suitable. Examples of the method of drying the polymer gel encompass (i) drying by heat, (ii) drying under reduced pressure, (iii) freeze-drying, and (iv) a solvent replacement method.

(Crushing Step)

The dried product of the polymer gel thus obtained in the drying step is crushed in the crushing step.

A method for crushing the dried product is not particularly limited. For example, it is possible that the dried product of the polymer gel is crushed with the use of a crusher and then, as necessary, a resultant product is classified so that a moisture absorbing material having a shape of particles is obtained. Examples of the crusher encompass (i) a mechanical crusher such as a rotor, (ii) a ball mill, and (iii) an air jet crusher.

Alternatively, the moisture absorbing material having a shape of particles can be produced by synthesizing polymer gel fine particles by emulsion polymerization in the polymer gel producing step.

(III) Dehumidifier

The moisture absorbing material in accordance with an embodiment of the present invention is configured as described above. Therefore, with a dehumidifier in which the moisture absorbing material is used, it is possible to efficiently carry out dehumidification without supercooling or large heat quantity. Hence, the scope of the present invention also encompasses a dehumidifier in which the moisture absorbing material in accordance with an embodiment of the present invention is used. The dehumidifier in accordance with an embodiment of the present invention will be described below in detail with reference to the drawings.

(Embodiment 1)

Figure 10:
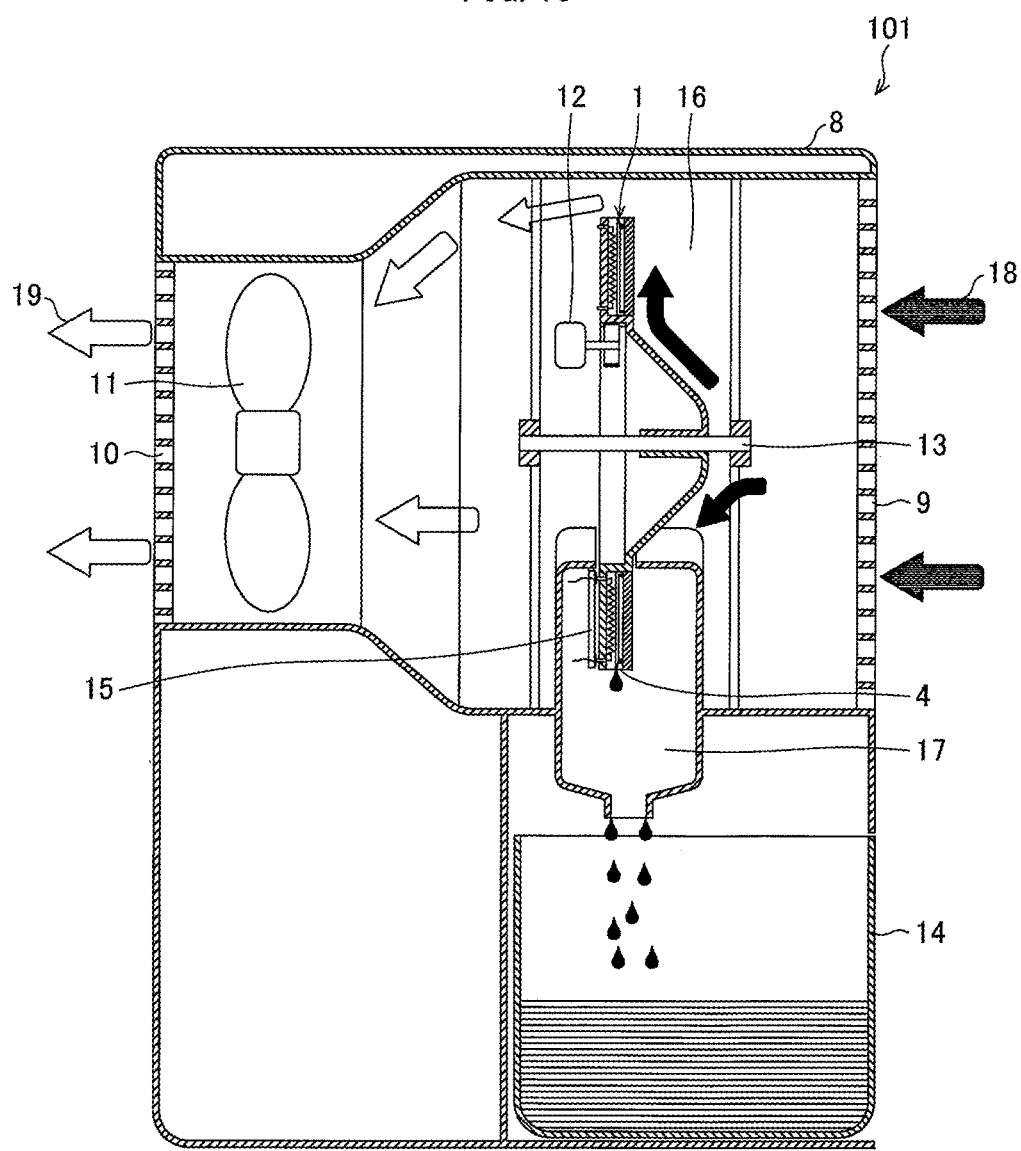
FIG. 10 is a longitudinal sectional view illustrating the dehumidifier in accordance with Embodiment 1 of the present invention.
Figure 11:
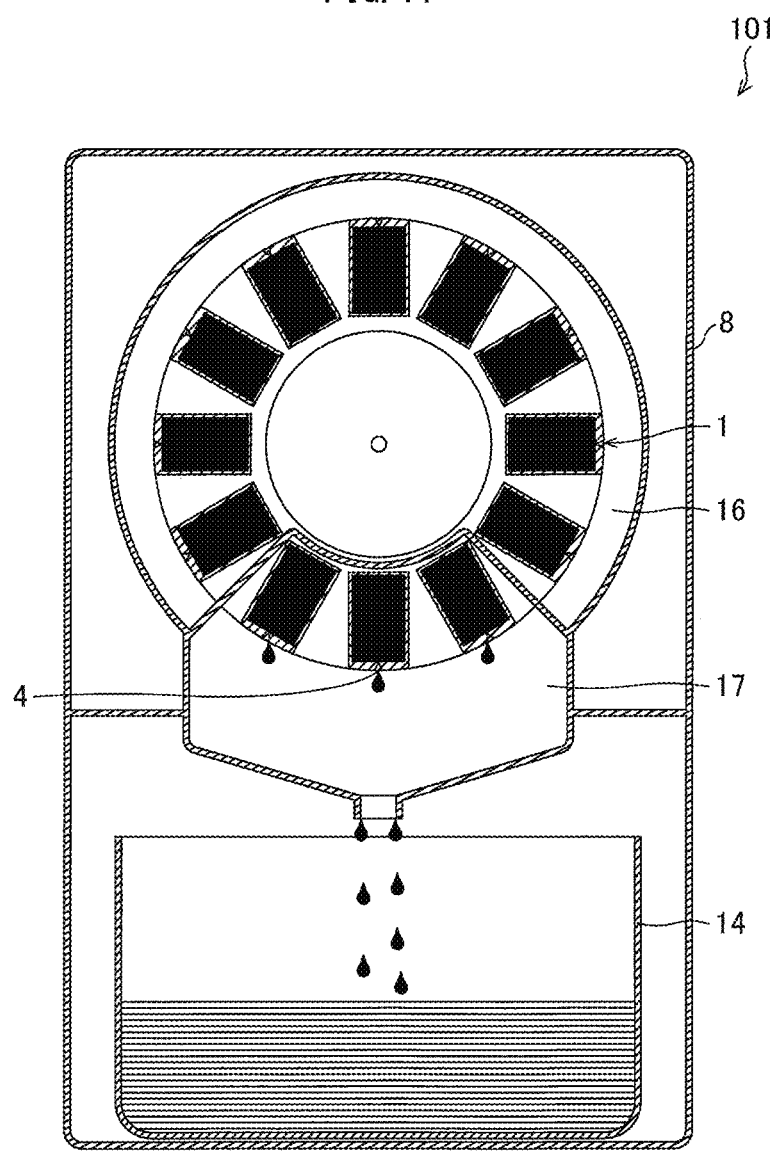
FIG. 11 is a transverse sectional view illustrating the dehumidifier in accordance with Embodiment 1 of the present invention.

FIG. 10 is a longitudinal sectional view illustrating a dehumidifier 101 in accordance with Embodiment 1 of the present invention. FIG. 11 is a transverse sectional view illustrating the dehumidifier 101. As illustrated in FIG. 10, the dehumidifier 101 includes a dehumidifier main body 8 having an air inlet 9 and an air outlet 10. Provided in the dehumidifier main body 8 are (i) a plurality of moisture absorbing units 1 which hold a moisture absorbing material in accordance with an embodiment of the present invention, (ii) a moisture absorption region 16 where the moisture absorbing units 1 absorb moisture in air, (iii) a dehydration region 17 where the moisture absorbing units 1, which have absorbed moisture in air, release the absorbed moisture as water, (iv) a water drain tank 14 in which water released from the moisture absorbing units 1 is stored, and (v) an air blowing fan 11 for (a) taking in, from the air inlet 9, air to be dehumidified and (b) discharging, from the air outlet 10, air which has been dehumidified. In Embodiment 1, a moisture absorbing material includes a temperature-responsive polymer as a stimuli-responsive polymer.

The air inlet 9 is provided on a side of the dehumidifier main body 8. The air outlet 10 is provided on another side facing the side on which the air inlet 9 is provided. This allows air, which has been taken in from the air inlet 9, to horizontally flow in the dehumidifier main body 8. The moisture absorption region 16 and the dehydration region 17 are provided at an air inlet 9-end of a pathway in which air, which has been taken in from the air inlet 9, flows. The air blowing fan 11 is provided at an air outlet 10-end of the pathway. The water drain tank 14 is provided below the dehydration region 17.

The plurality of moisture absorbing units 1 are provided on a plane parallel to (i) the side of the dehumidifier main body 8 on which side the air inlet 9 is provided and (ii) the another side of the dehumidifier main body 8 on which another side the air outlet 10 is provided. As illustrated in FIG. 11, the moisture absorbing units 1 are provided at intervals in a radial pattern along a circumference of a circle around a unit rotation axis 13 such that the moisture absorbing units 1 can be rotated around the unit rotation axis 13. Rotation of the unit rotation axis 13 is driven by a unit rotating motor 12.

A region, in which the plurality of moisture absorbing units 1 are rotated around the unit rotation axis 13, is divided into (i) the moisture absorption region 16 located at an upper part and (ii) the dehydration region 17 located at a lower part. By rotating, the moisture absorbing units 1 can move between the moisture absorption region 16 and the dehydration region 17. Air, which has been taken in from the air inlet 9, passes through the moisture absorption region 16 and is prevented from flowing through the dehydration region 17. In the dehydration region 17, a heater-specific fixed electrode 15 is provided so as to be able to come into contact with a heater electrode 6 of a heater 5 of each of the moisture absorbing units 1 so that there is electric conduction through the heater 5.

Figure 7:
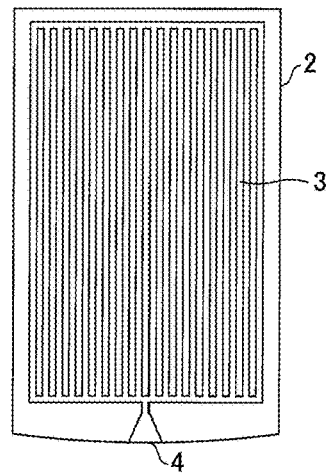
FIG. 7 is a front view illustrating a moisture absorbing unit included in the dehumidifier in accordance with Embodiment 1 of the present invention.
Figure 8:
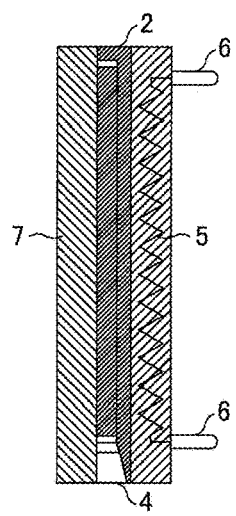
FIG. 8 is a longitudinal sectional view illustrating the moisture absorbing unit included in the dehumidifier in accordance with Embodiment 1 of the present invention.
Figure 9:
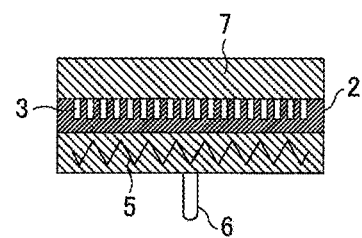
FIG. 9 is a transverse sectional view illustrating the moisture absorbing unit included in the dehumidifier in accordance with Embodiment 1 of the present invention.

FIGS. 7 through 9 illustrated a structure of each of the moisture absorbing units 1. FIG. 7 is a front view illustrating a moisture absorbing unit 1. FIG. 8 is a longitudinal sectional view illustrating the moisture absorbing unit 1. FIG. 9 is a transverse sectional view illustrating the moisture absorbing unit 1. The moisture absorbing unit 1 is a plate-like member in which (i) a moisture absorbing material 7 in accordance with an embodiment of the present invention is laminated on a base material 2, which has a shape of a plate, so that a laminated body is formed, (ii) a heater 5, which has a shape of a plate, is provided on a base material 2-side of the laminated body so as to be in contact with the base material 2. On a side of the base material 2 which side is in contact with the moisture absorbing material 7, a plurality of water absorbing grooves 3 are provided so as to extend linearly and parallel to each other (see FIGS. 7 and 9). At a center part of one of ends parts of the base material 2, which end parts are located in line with the directions in which the water absorbing grooves 3 extend, a drip opening 4 is provided so as to discharge water out of the absorbing unit 1 by dripping, which water has been released from the moisture absorbing material 7.

A dehumidification operation by the dehumidifier 101 will be described next with reference to FIG. 10. First, when the dehumidifier 101 has been operated, the moisture absorbing units 1 are controlled by the unit rotating motor 12 to rotate around the unit rotation axis 13. In the pathway in which air in the dehumidifier 101 flows, the air blowing fan 11 is operated so that air (moist air) 18, which is to be dehumidified, is taken into the dehumidifier 101 from the air inlet 9.

The air (moist air) 18, which has been taken into the dehumidifier 101, comes into contact with moisture absorbing materials 7 of respective moisture absorbing units 1 when the air (moist air) 18 passes through the moisture absorption region 16. The moisture absorbing materials 7, which are hydrophilic at room temperature, absorb moisture in the air (moist air). The moist air is thus dehumidified when passing through the moisture absorption region 16. Then, air (dry air) 19, which is obtained by dehumidifying the moist air, is discharged from the air outlet 10.

Figure 6:
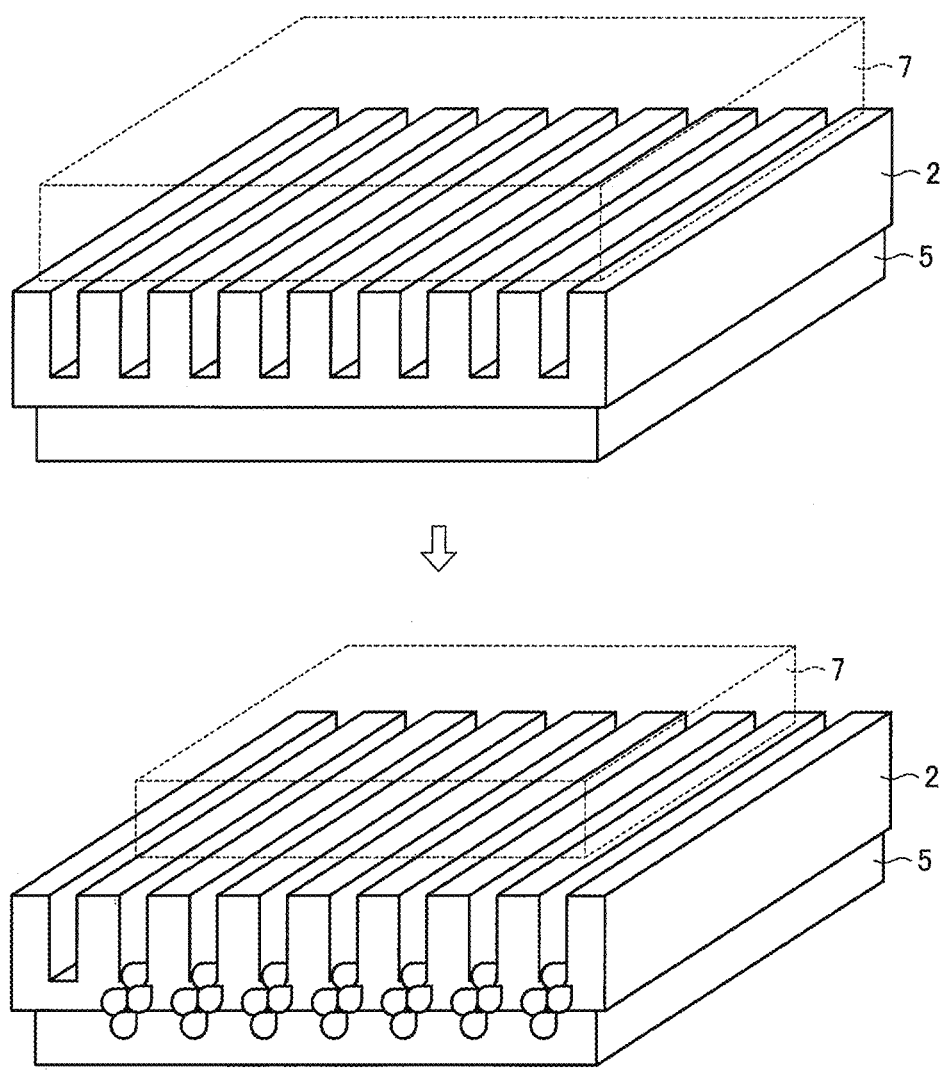
FIG. 6 is a view schematically illustrating a dehumidifier in accordance with any one of Embodiments 1 and 2 of the present invention, in which water seeping from a moisture absorbing material in response to application of an external stimulus is collected into a water collecting part.

The rotation of the unit rotation axis 13 causes the moisture absorbing units 1, which have absorbed the moisture in the air (moist air), to rotate around the unit rotation axis 13, that the moisture absorbing units 1 move from the moisture absorption region 16 into the dehydration region 17. In the dehydration region 17, a heater electrode 6 of a heater 5 of each of the moisture absorbing units 1 come into contact with the heater-specific fixed electrode 15 so that electricity is conducted. This causes each of the moisture absorbing units 1, which have moved to the dehydration region 17, to be heated by the heater 5. Since the heater 5 heats the base material 2 and heats the moisture absorbing material 7 through the base material 2, A temperature of the moisture absorbing material 7 becomes an LCST or higher, so that the moisture absorbing material 7 becomes hydrophobic. This causes moisture, which has been absorbed by the moisture absorbing material 7, to be released as water from the moisture absorbing material 7. FIG. 6 schematically illustrates how water, which has seeped out of a moisture absorbing material 7 by heat, is collected into water absorbing grooves 3 of a base material 2 by capillarity. A base material 2 including water absorbing grooves 3 thus serves as a water collecting part. Water, which has been released, passes through the water absorbing grooves 3 and is then discharged from the drip opening 4 into the water drain tank 14.

Figure 5:
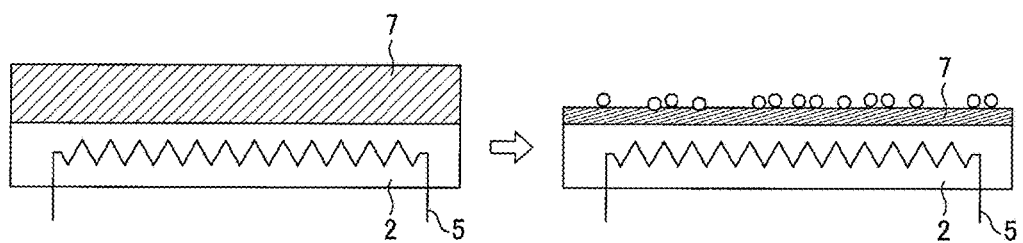
FIG. 5 is a view schematically illustrating a dehydration behavior of a moisture absorbing material in accordance with an embodiment of the present invention.

FIG. 5 schematically illustrates a dehydration behavior of a moisture absorbing material 7 in a case where (i) the moisture absorbing material 7 is laminated on a base material 2 which includes no water absorbing groove 3 and (ii) the base material 2 and the moisture absorbing material 7 are heated by a heater 5 embedded in the base material. As illustrated in FIG. 5, a small amount of moisture, which has seeped from the moisture absorbing material 7, is attached as water droplets to an upper surface of the moisture absorbing material 7. Conventionally, it was considered thus difficult to extract a small amount of water which has seeped from a moisture absorbing material 7. In contrast, in a case where a base material 2 including water absorbing grooves 3 is used, a small amount of water seeps out toward a contact surface that in contact with the base material 2, where heat is easily conducted. Then, the water which has seeped toward the contact surface, is sucked into the fine water absorbing grooves 3 of the base material 2 by capillarity, and is therefore efficiently collected. In addition, since the base material 2 including the water absorbing grooves 3 is used, an advantageous effect is obtained to facilitate heating of the base material 2 and the moisture absorbing materials 7.

In Embodiment 1, the moisture absorbing units 1 are provided so that when a moisture absorbing unit 1 moves to the dehydration region 17, a corresponding drip opening 4 is located toward the water drain tank 14.

A material for a base material 2 is not limited to any particular one, provided that heat of a heater 5 can be transmitted to a moisture absorbing material 7 via the base material 2. Examples of a suitable material for the base material 2 encompass metals such as aluminum and stainless steel. Examples of the material for the base material 2 further encompass (i) resins such as polydimethylsiloxane (PDMS), polycarbonate (PC), polyolefin, and polyacrylate, (ii) silica, and (iii) ceramic. In a case where the polydimethylsiloxane (PDMS) or the like is used as a material for the base material 2, the base material 2 is more preferably configured so that surfaces of the base material 2 are coated with (i) a photothermal conversion material such as carbon black, iron oxide particles or the like or (ii) a magnetic-thermal conversion such as iron oxide ceramic particles, magnetite nanoparticles, or the like. This allows the base material 2 to be heated by light irradiation, a magnetic field, or the like, so that a moisture absorbing material 7 can be heated.

In a case where the moisture absorbing material in accordance with an embodiment of the present invention is used, it is possible to directly extract absorbed moisture. This makes a heat exchanger unnecessary. Furthermore, in a case where a responsive polymer for the moisture absorbing materials 7 has an LCST substantially higher than room temperature, such as a relatively low temperature of 40° C. or higher, such as 40° C. to 100° C., more preferably 40° C. to 70° C., it is possible, unlike conventional dehumidifiers, to directly extract absorbed moisture in liquid form from the moisture absorbing materials 7 merely by heating the moisture absorbing materials 7 to the LCST or higher without supercooling or large heat quantity.

In Embodiment 1, the plurality of moisture absorbing units 1 including the respective moisture absorbing materials 7 are arranged in a radial pattern so as to be rotatable. This makes possible to use moisture absorbing units 1 in the moisture absorption region 16 for moisture absorption while also applying a stimulus to remaining moisture absorbing units 1 in the dehydration region 17 so as to extract water. That is, it is possible to simultaneously carry out moisture absorption and dehydration. The plurality of moisture absorbing units 1 can be continuously rotated at a fixed speed, or can be rotated intermittently in steps.

In the example described above, each of the base material 2 includes, on a surface thereof facing the moisture absorbing material 7, a plurality of water absorbing grooves 3 which extend linearly and parallel to each other. However, a shape of the water absorbing grooves 3 is not limited to linear shape, but can be a curved shape. Furthermore, the water absorbing grooves 3 are not limited to parallel grooves. Alternatively, the water absorbing grooves 3 can have any shape, provided that the water absorbing grooves 3 are structured so that water, which has been released, can pass through bottom parts of the grooves and then flow into the drip opening 4. Therefore, examples of the shape of the water absorbing grooves 3 encompass (i) an irregular shape in which curved grooves intersect each other at a plurality of points and (ii) a regular grid pattern.

A size of the water absorbing grooves 3 is not particularly limited, provided that water can be collected by capillarity. However, the water absorbing grooves 3 are preferably fine water absorbing grooves. For example, in a cross section of the water absorbing grooves 3, (i) a width of each groove (recess) can be 10 μm to 10 mm and (ii) a depth of each of the water absorbing grooves 3 can be 1 μm to 10 mm. In a case where the water absorbing grooves 3 are a plurality of water absorbing grooves 3 extending regularly, linearly, and parallel to each other, or, the water absorbing grooves 3 form a regular grid pattern, a distance between a center part of a water absorbing groove 3 and a center part of an adjacent water absorbing groove 3 in a cross section of the water absorbing grooves 3 is, for example, 10 μm to 500 μm. Such fine water absorbing grooves can be formed by any method. Examples of a suitable method encompass lithography, MEMS technology, and nano-imprinting. A thickness of the base material 2 is also not particularly limited, provided that the water absorbing grooves 3 can be formed. For example, the thickness can be 1 mm to 10 mm.

In the example described above, the moisture absorbing materials each include a temperature-responsive polymer as a stimuli-responsive polymer. Alternatively, the moisture absorbing materials can each include a stimuli-responsive polymer which is responsive to other stimuli. In such a case, the heater 5 can be replaced by a stimulus applying section, examples of which encompass devices that apply corresponding stimuli such as (i) light such as an infrared ray, an ultraviolet ray, and visible light and (ii) an electrical field.

In the example described above, a heater 5 has a shape of a plate so that a heat as a stimulus is efficiently applied to a moisture absorbing material 7. Note, however, the shape of the heater 5 is not limited to that of a plate. Alternatively, a heater 5 can have any shape, provided that the heater 5 can be provided along the moisture absorbing material 7. In the example described above, the heater 5 is used so that heat as a stimulus is applied to the moisture absorbing material 7. Alternatively, any heating device other than a heater 5 can be used, provided that heat as a stimulus can be applied to the moisture absorbing material 7. Examples of such a heating device encompass a halogen lamp, an infrared lamp, and a xenon lamp.

In the example described above, a moisture absorbing material 7 has a shape of a plate or a layer. Note, however, that a thickness of the moisture absorbing material 7 is also not particularly limited. For example, the thickness of the moisture absorbing material 7 can be 1 mm to 10 mm. The shape of the moisture absorbing material 7 is also not limited to these, but can be, for example, a shape of particles.

In the example described above, a drip opening 4 of each of the moisture absorbing units 1 is provided at a center part of one of ends parts located in line with directions in which water absorbing grooves 3 extend. Alternatively, the drip opening 4 can be provided at any position, provided that water passes through the water absorbing grooves 3 and is then dropped onto the drip opening 4.

(Embodiment 2)

Figure 12:
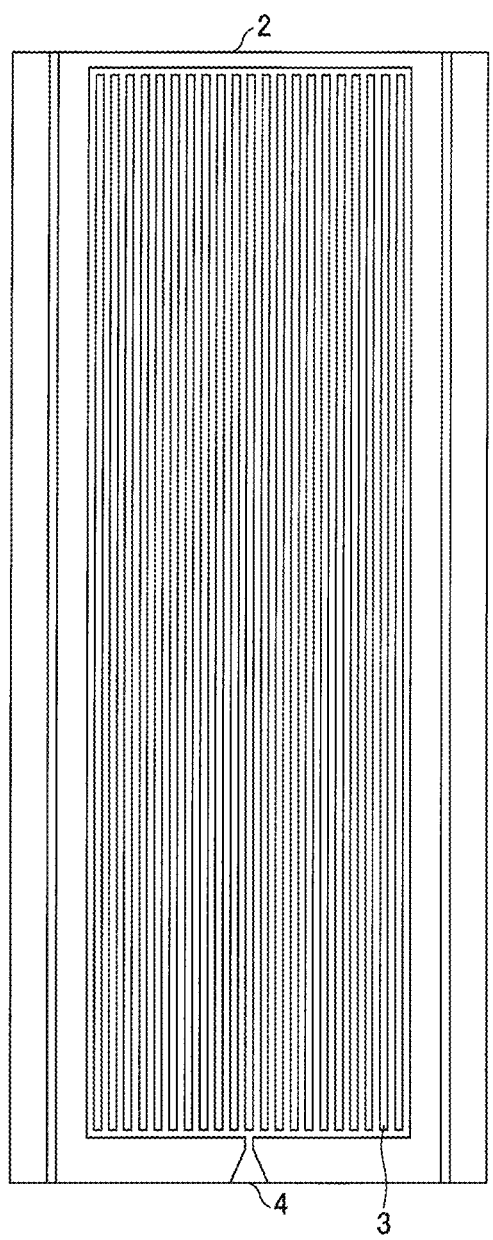
FIG. 12 is a front view illustrating a moisture absorbing unit included in a dehumidifier in accordance with Embodiment 2 of the present invention.
Figure 13:
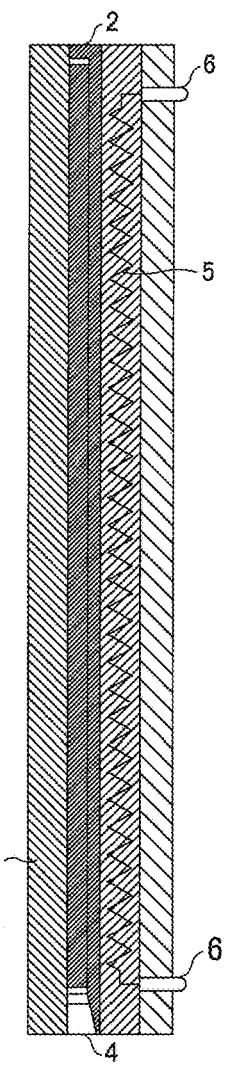
FIG. 13 is a longitudinal sectional view illustrating the moisture absorbing unit included in the dehumidifier in accordance with Embodiment 2 of the present invention.
Figure 14:
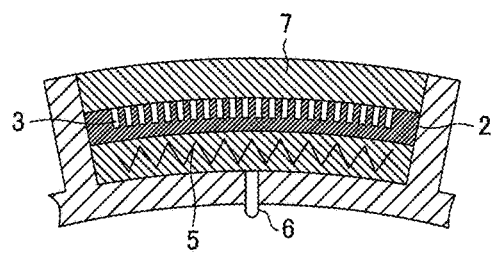
FIG. 14 is a transverse sectional view illustrating the moisture absorbing unit included in the dehumidifier in accordance with Embodiment 2 of the present invention.
Figure 15:
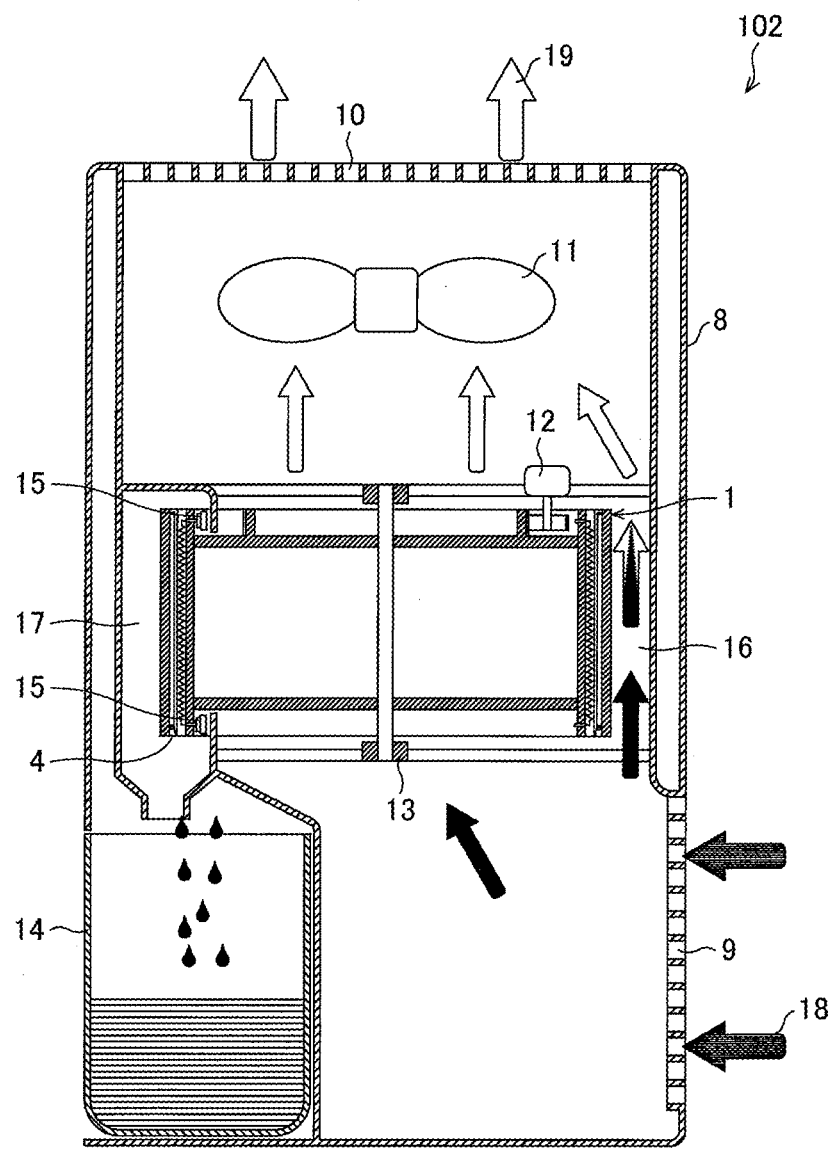
FIG. 15 is a longitudinal sectional view illustrating the dehumidifier in accordance with Embodiment 2 of the present invention.
Figure 16:
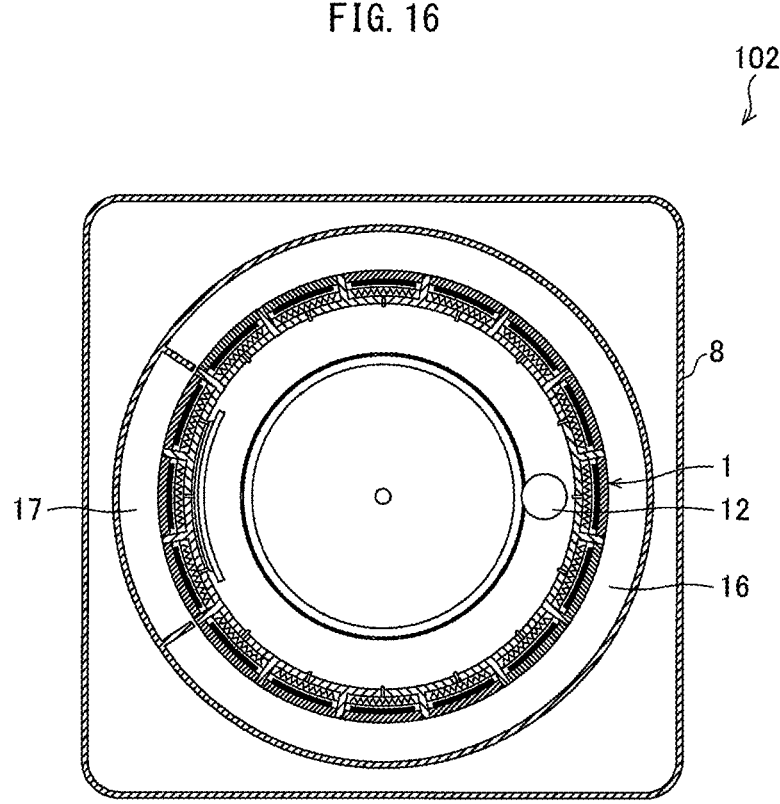
FIG. 16 is a transverse sectional view illustrating the dehumidifier in accordance with Embodiment 2 of the present invention.

FIG. 15 is a longitudinal sectional view illustrating a dehumidifier 102 in accordance with Embodiment 2 of the present invention. FIG. 16 is a transverse sectional view illustrating the dehumidifier 102. FIGS. 12 through 14 illustrate a structure of each of moisture absorbing units 1 included in the dehumidifier 102.

For convenience, members identical in function to those illustrated in the drawings described in Embodiment are given the same reference numerals, and their descriptions will be omitted.

As illustrated in FIG. 15, the dehumidifier 102 includes a dehumidifier main body 8 having an air inlet 9 and an air outlet 10. Provided in the dehumidifier main body 8 are moisture absorbing units 1, a moisture absorption region 16, a dehydration region 17, a water drain tank 14, and an air blowing fan 11.

In Embodiment 2, the air inlet 9 is provided at a lower part of a side of the dehumidifier main body 8, and the air outlet 10 is provided at an upper surface of the dehumidifier main body 8. This causes air, which has been taken in from the air inlet 9, to flow from bottom to top in the dehumidifier main body 8. The moisture absorption region 16 and the dehydration region 17 are provided at an air inlet 9-end of a pathway in which air, which has been taken in from the air inlet 9, flows. The air blowing fan 11 is provided in a region at an air outlet 10-end of the pathway. The water drain tank 14 is provided below the dehydration region 17.

The plurality of moisture absorbing units 1 are provided along a surface corresponding to a side surface of a cylinder having, as a center axis, a unit rotation axis 13 which vertically extends in the dehumidifier main body 8. As illustrated in FIG. 16, the moisture absorbing units 1 are (i) provided at intervals so as to be horizontally adjacent to each other and (ii) provided so as to be rotated around with the unit rotation axis 13 serving as a rotation axis. A rotation of the unit rotation axis 13 is driven by a unit rotating motor 12.

FIG. 12 is a front view illustrating a moisture absorbing unit 1. FIG. 13 is a longitudinal sectional view illustrating the moisture absorbing unit 1. FIG. 14 is a transverse sectional view illustrating the moisture absorbing unit 1. The moisture absorbing unit 1 is a member in which (i) a moisture absorbing material 7 in accordance with an embodiment of the present invention is laminated on a base material 2, so that a laminated body is formed, (ii) a heater 5 is provided on a base material 2-side of the laminated body so as to be in contact with the base material 2. In Embodiment 2, in the case where the moisture absorbing units 1 are adjacently provided along a surface corresponding to a side surface of a cylinder having the unit rotation axis 13 as a center axis, a transverse cross section of each of the moisture absorbing units 1 has a shape of a circular arc so that the moisture absorbing units 1 as a whole form a shape of a cylinder having the unit rotation axis 13 as a center axis. That is, a base material 2, a transverse cross section of each of a moisture absorbing material 7, and a heater 5 has a plate-like shape curved in the form of a circular arc. In so doing, as illustrated in FIG. 16, each of the moisture absorbing units 1 is configured so that a moisture absorbing material 7 is provided on an outer side of the circular arc, and a heater 5 is provided on an inner side of the circular arc. On a side of the base material 2 which side is in contact with the moisture absorbing material 7, a plurality of water absorbing grooves 3 are provided so as to extend linearly and parallel to each other (see FIGS. 12 and 14). At a center part of one of ends parts of the base material 2, which end parts are located in line with the directions in which the water absorbing grooves 3 extend, a drip opening 4 is provided so as to discharge water out of the moisture absorbing unit 1 by dripping, which water has been released from the moisture absorbing material 7.

In Embodiment 2, as illustrated in FIG. 16, a region outside of the cylinder formed by the plurality of moisture absorbing units 1, that is, a region in contact with the moisture absorbing materials 7, is horizontally divided into the moisture absorption region 16 and the dehydration region 17. This allows the moisture absorbing units 1 to move, by rotating, between the moisture absorption region 16 and the dehydration region 17. As illustrated in FIG. 15, air, which has been taken in from the air inlet 9, passes through the moisture absorption region 16 and is prevented from flowing through the dehydration region 17. In the dehydration region 17, a heater-specific fixed electrode 15 is provided so as to be able to come into contact with a heater electrode 6 of a heater 5 of each of the moisture absorbing units 1 so that there is electric conduction through the heater 5.

In Embodiment 2, air (moist air) 18, which has been taken into the dehumidifier 102 from the air inlet 9, comes into contact with moisture absorbing materials 7 of respective moisture absorbing units 1 when the air (moist air) 18 passes through the moisture absorption region 16 between the plurality of moisture absorbing units 1 and sides of the dehumidifier main body 8. The moisture absorbing materials 7, which are hydrophilic at room temperature, absorb moisture in the air (moist air). The moist air is thus dehumidified when passing through the moisture absorption region 16. Then, air (dry air) 19, which is obtained by dehumidifying the moist air, is discharged from the air outlet 10.

The rotation of the unit rotation axis 13 causes the moisture absorbing units 1, which have absorbed the moisture in the air (moist air), to rotate around the unit rotation axis 13, so that the moisture absorbing units 1 move from the moisture absorption region 16 into the dehydration region 17. Then, moisture, which has been heated by a heater 5 in the dehydration region 17 and then absorbed by a moisture absorbing material 7, is released as water from the moisture absorbing material 7. The water, which has been thus released, is collected into water absorbing grooves 3 of a base material 2 by capillarity. Then, the water passes through the water absorbing grooves 3, and is then discharged from the drip opening 4 into the water drain tank 14.

Note that each of the moisture absorbing units 1 is configured so that a drip opening 4 is located so as to face the water drain tank 14.

Embodiment 2 is identical to Embodiment 1 in terms of (i) the advantageous effect obtained by using the moisture absorbing material in accordance with an embodiment of the present invention and (ii) the advantageous effect obtained by rotating the moisture absorbing units 1.

Embodiment 2 is also identical to Embodiment 1 in terms of (i) the material for and the thickness of each of the base materials 2, (ii) the method of rotating the moisture absorbing units 1, and (iii) the size of the water absorbing grooves 3. In Embodiment 2, as in Embodiment 1, each of the following is changeable: (i) the shape of the water absorbing grooves 3, (ii) a stimuli-responsive polymer included in each of the moisture absorbing materials 7, (iii) a stimulus applying section, (iv) the shape and type of each of the heaters 5, (v) the position of each of the drip openings 4, and (vi) the shape of each of the moisture absorbing materials 7.

Note that in the example described above, each of the moisture absorbing units 1 is configured so that a moisture absorbing material 7 is provided on an outer side of the circular arc, and a heater 5 is provided on an inner side of the circular arc. In contrast, each of the moisture absorbing units 1 can be configured so that a moisture absorbing material 7 is provided an inner side of the circular arc, and a heater 5 is provided on an outer side of the circular arc. In such a case, the heater-specific fixed electrode 15 is provided outside of the moisture absorbing units 1.

In the example described above, the plurality of moisture absorbing units 1 are provided along a side surface of a cylinder having, as a center axis, a unit rotation axis 13 which vertically extends in the dehumidifier main body 8. Alternatively, the plurality of moisture absorbing units 1 can be, instead of being provided along a side surface of a cylinder, provided along side surfaces of a hollow prism whose cross section is polygonal.

The scope of the present invention also encompasses a configuration in which the moisture absorbing material in accordance with an embodiment of the present invention is used for any of the dehumidifiers disclosed in the specifications of all of the patent applications, including the Japanese Patent Application, Tokugan, No. 2013-252901, which concern a dehumidifier and which have been/will be filed by the applicant of the present application.

The present invention is not limited to the embodiments, but can be altered by a skilled person in the art within the scope of the claims. An embodiment derived from a proper combination of technical means each disclosed in a different embodiment is also encompassed in the technical scope of the present invention.

[Summary]

A moisture absorbing material in accordance with Aspect 1 of the present invention is configured to include: a dried product of a polymer gel, the polymer gel including a stimuli-responsive polymer whose affinity with water changes reversibly in response to an external stimulus and a hydrophilic polymer, and the stimuli-responsive polymer and the hydrophilic polymer forming an interpenetrating polymer network structure or a semi-interpenetrating polymer network structure.

With the configuration, it is possible to efficiently carry out dehumidification without supercooling or large heat quantity in a case where the moisture absorbing material is used as a dehumidifying material.

A moisture absorbing material in accordance with Aspect 2 of the present invention can be configured in Aspect 1 such that the external stimulus is heat, light, an electrical field, or pH.

With the configuration, it is possible that moisture, which was in air and has been absorbed by the moisture absorbing material, can be directly extracted in liquid form by merely heating the moisture absorbing material to an LCST or higher.

A moisture absorbing material in accordance with Aspect 3 of the present invention can be configured in Aspect 1 or 2 such that the stimuli-responsive polymer is (i) at least one polymer selected from the group consisting of: poly(N-alkyl (meth)acrylamide); poly(N-vinylalkylamide); poly(N-vinylpyrrolidone); poly(2-alkyl-2-oxazoline); polyvinyl alkyl ether; a copolymer of a polyethylene oxide and a polypropylene oxide; poly(oxyethylene vinyl ether); a cellulose derivative; and a copolymer of these or (ii) a product obtained by crosslinking the at least one polymer.

With the configuration, it is possible that moisture, which was in air and has been absorbed by the moisture absorbing material, can be directly extracted in liquid form by merely heating the moisture absorbing material to an LCST or higher.

A moisture absorbing material in accordance with Aspect 4 of the present invention can be configured in any one of Aspects 1 through 3 such that the hydrophilic polymer is (i) at least one polymer selected from the group consisting of: alginic acid; hyaluronic acid; chitosan; a cellulose derivative; poly(meth)acrylic acid; polyethylene glycol; and a copolymer of these or (ii) a product obtained by crosslinking the at least one polymer.

With the configuration, it is possible to efficiently carry out dehumidification without supercooling or large heat quantity in a case where the moisture absorbing material is used as a dehumidifying material.

A dehumidifier in accordance with Aspect 5 of the present invention includes: a moisture absorbing material of any one of Aspects 1 through 4; and a stimulus applying section (heater 5) for applying a stimulus to the moisture absorbing material.

With the configuration, it is possible to efficiently carry out dehumidification without supercooling or large heat quantity.

A dehumidifier in accordance with Aspect 6 of the present invention is configured in Aspect 5 to further include: a water collecting part (base material 2) which is provided so as to be in contact with the moisture absorbing material and which collects water that has seeped from the moisture absorbing material in response to application of a stimulus.

With the configuration, moisture, which was in air and has been absorbed by the moisture absorbing material, can be efficiently extracted.

A dehumidifier in accordance with Aspect 7 of the present invention is configured in Aspect 6 such that the water collecting part (base material 2) has, on a surface thereof, water absorbing grooves, which surface is in contact with the moisture absorbing material.

With the configuration, a small amount of moisture seeping from the moisture absorbing material can be efficiently extracted by collecting the small amount of moisture by capillarity. With the configuration, it is also possible to facilitate application of a stimulus to the base material and to the moisture absorbing material.

(Embodiment 3)

The following description will discuss the present invention in more detail by Embodiment 3 in which Examples of the present invention are described. Note, however, that the present invention is not limited to these Examples.

EXAMPLE 1

Synthesis of Polymer Gel in which Interpenetrating Polymer Network Structure is Formed by Alginic Acid and Poly(N-Isopropyl Acrylamide)

700 mg of N-isopropyl acrylamide (hereinafter also abbreviated as "NIPAM"), 700 mg of sodium alginate (hereinafter also abbreviated as "Alg"), and 58 mg of methylenebisacrylamide (hereinafter also abbreviated as "MBAA") were dissolved in 23 mL of pure water. To a resultant solution, 1 mL of N,N,N',N'-tetramethylethylene diamine (hereinafter also abbreviated as "TEMED") at 0.8 mol/L and 1 mL of ammonium persulfate (hereinafter also abbreviated as "APS") at 0.1 mol/L were added. Then, a resultant mixture was reacted in an ice bath for 6 hours, so that a hydrogel, in which poly(N-isopropyl acrylamide) was crosslinked by MBAA, was obtained. Then, the hydrogel thus obtained was immersed in 100 mL of a calcium chloride solution at 0.25 mol/L, and was allowed to stand for 2 days, so that Alg was crosslinked by calcium ions. This is how a polymer gel, in which an interpenetrating polymer network structure was formed by poly(N-isopropyl acrylamide) and alginic acid, was synthesized (such a polymer gel will be hereinafter also abbreviated as "Alg/PNIPAM IPN gel"). FIG. 1 illustrates the Alg/PNIPAM IPN gel thus synthesized and a method of producing the Alg/PNIPAM IPN gel.

<Phase Transition Behavior of Alg/PNIPAM IPN Gel>

The Alg/PNIPAM IPN gel thus obtained was immerse in pure water, and was allowed to stand at a constant temperature for 24 hours. Then, a weight of the gel was measured. Then, the gel was dried by heat, and then a dry weight of the gel was measured. Based on the weight and the dry weight of the gel after the gel was allowed to stand for 24 hours, a water content was calculated by the following formula:

Water content=(Weight of gel after standing for 24 hours−Dry weight of gel after standing for 24 hours)/Dry weight Water contents of the gel in cases where the gel was allowed to stand for 24 hours at constant temperatures of 15° C., 25° C., 30° C., 35° C., 40° C., and 50° C. were calculated, and then a phase transition behavior of the Alg/PNIPAM IPN gel along with a temperature change was studied.

Figure 2:
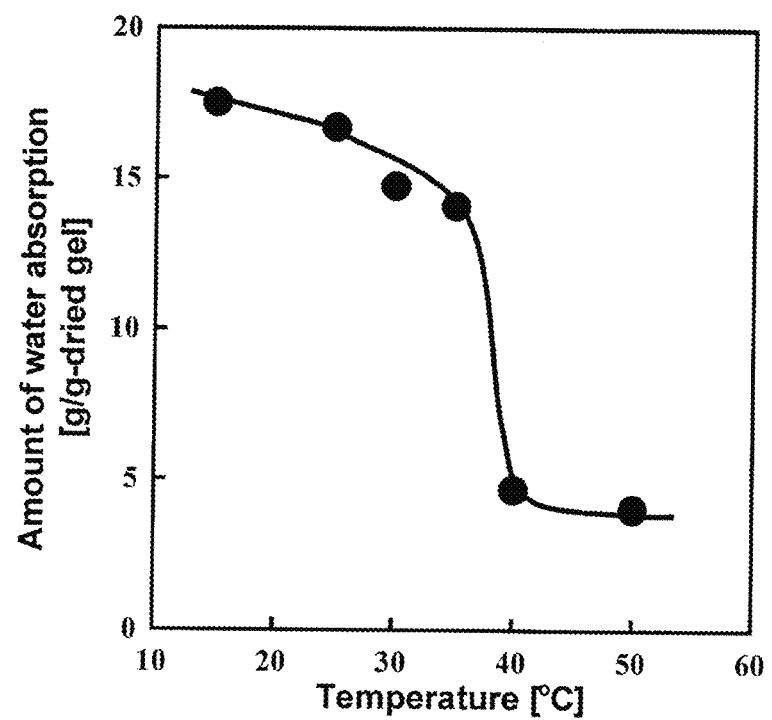
FIG. 2 is a view showing results of evaluating a phase transition behavior of a moisture absorbing material along with a temperature change in Example of the present invention.

FIG. 2 shows the results of studying the phase transition behavior. In FIG. 2, (i) the vertical axis indicates water content (shown as "Amount of water absorption" in FIG. 2. The water content, in other words, is the amount of moisture absorbed in water. Unit: g/g-dried gel) and (ii) the horizontal axis indicates temperature (Unit: ° C.). FIG. 2 indicates that the Alg/PNIPAM IPN gel obtained had a temperature between 35° C. and 40° C. at which temperature the water content drastically changed, in other words, a temperature at which affinity with water drastically changed. That is, the Alg/PNIPAM IPN gel was hydrophilic at 35° C. or lower, and becomes hydrophobic at higher than 40° C.

<Moisture Absorption Behavior of Alg/PNIPAM IPN Gel>

The Alg/PNIPAM IPN gel obtained was frozen at −20° C., and was dried at a reduced pressure of 20 Pa for 24 hours. By allowing a dried product of the obtained Alg/PNIPAM IPN gel to stand at a constant temperature of 20° C. and a constant humidity of 80% RH, and measuring changes in weight over time, a moisture absorption behavior of the dried product of the Alg/PNIPAM IPN gel was studied.

Figure 3:
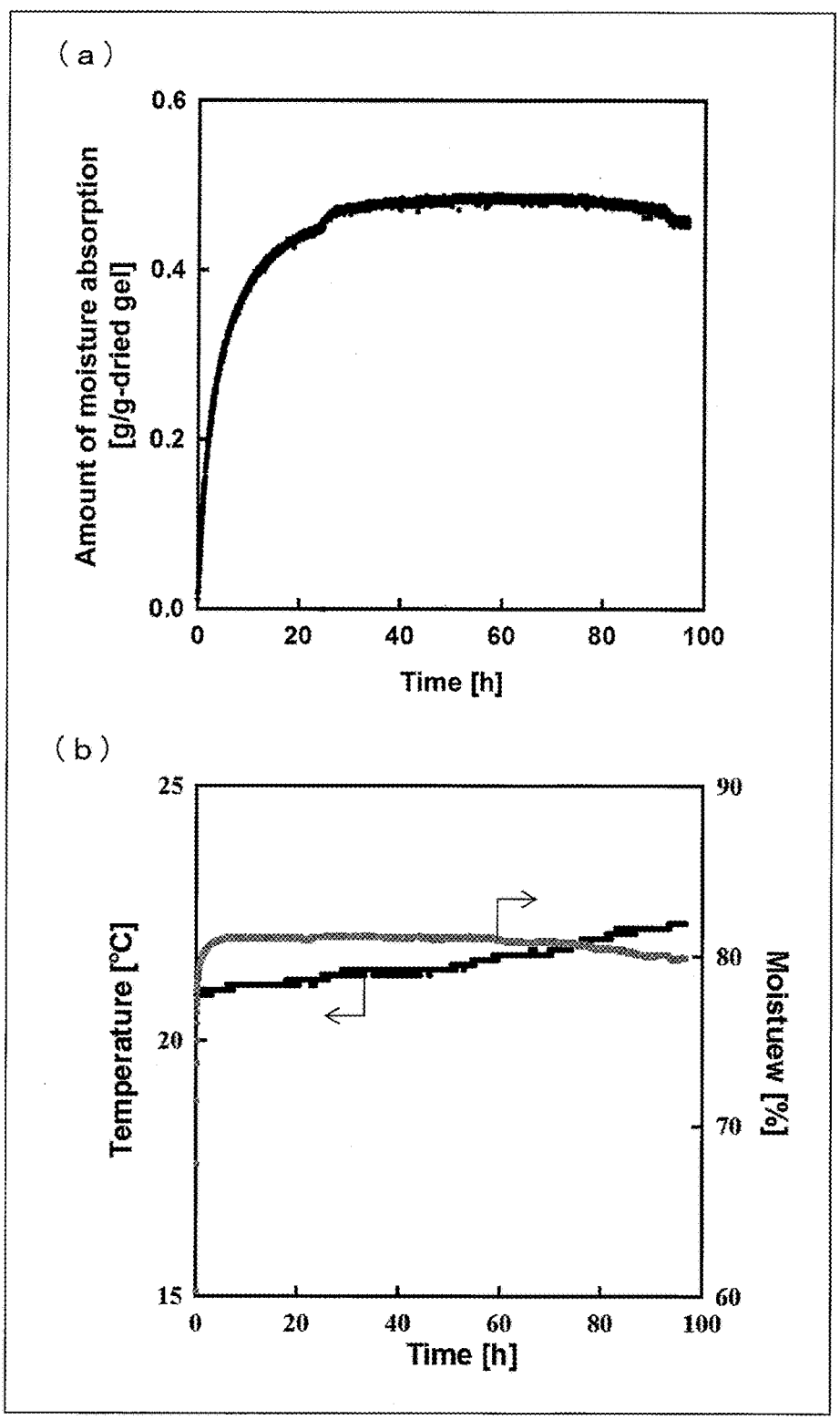
FIG. 3 is a view showing results of evaluation of a moisture absorption behavior of a moisture absorbing material in Example of the present invention.

FIG. 3 shows the results of studying the moisture absorption behavior. In (a) of FIG. 3, (i) the vertical axis indicates water content (shown as "Amount of moisture absorption" in FIG. 3. The water content, in other words, is the amount of moisture absorbed in air. Unit: g/g-dried gel) and (ii) the horizontal axis indicates time (Unit: time). As indicated by (a) of FIG. 3, the dried Alg/PNIPAM IPN gel had high moisture absorption performance. (b) of FIG. 3 is a graph showing that the moisture absorption behavior was studied under conditions of (i) constant temperatures of 21° C. to 22° C. and (ii) a constant humidity of approximately 80% RH.

<Dehydration Behavior of Dried Product of Alg/PNIPAM IPN Gel>

The dried product of the Alg/PNIPAM IPN gel was allowed to stand for 80 hours at a constant temperature of 25.5° C. and a constant humidity of approximately 80% RH, so that the dried product sufficiently absorbed moisture. The dried product of the Alg/PNIPAM IPN gel, which had thus absorbed moisture, was heated at 60° C. with the use of a heater. A surface of the gel was video recorded, and the dehydration behavior was studied.

Figure 4:
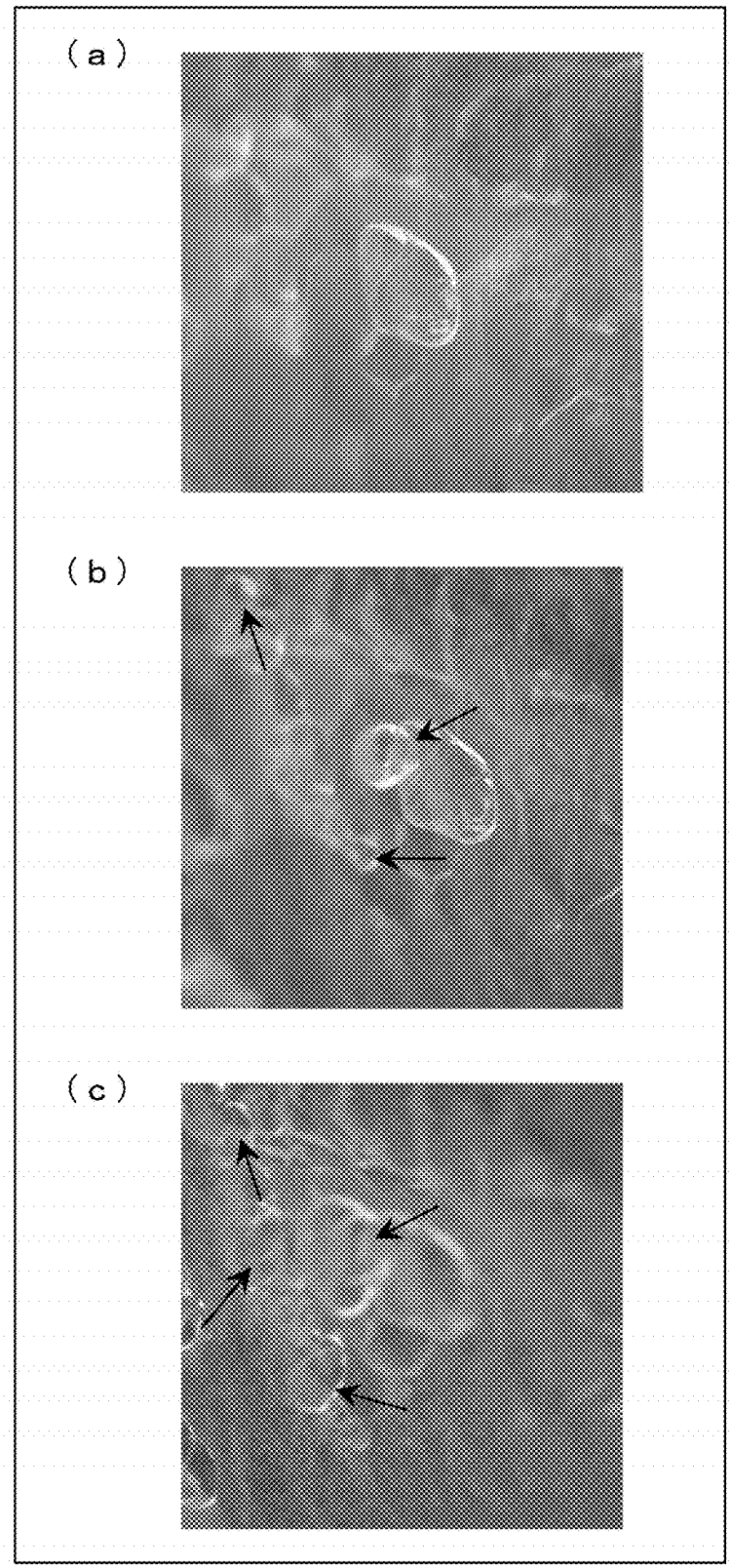
FIG. 4 is a view showing results of evaluation of a dehydration behavior of a moisture absorbing material in Example of the present invention.

FIG. 4 shows the results of studying the dehydration behavior. (a), (b), and (c) of FIG. 4 each show the surface of the dried product of the Alg/PNIPAM IPN gel immediately after the heating at 60° C., 1 minute after the heating at 60° C., and 3 minutes after the heating at 60° C. FIG. 4 indicates that application of heat of 60° C. caused moisture, which had been absorbed into the dried product of the Alg/PNIPAM IPN gel, to seep out in liquid form from the dried product.

Comparative Example 1

Figure 17:
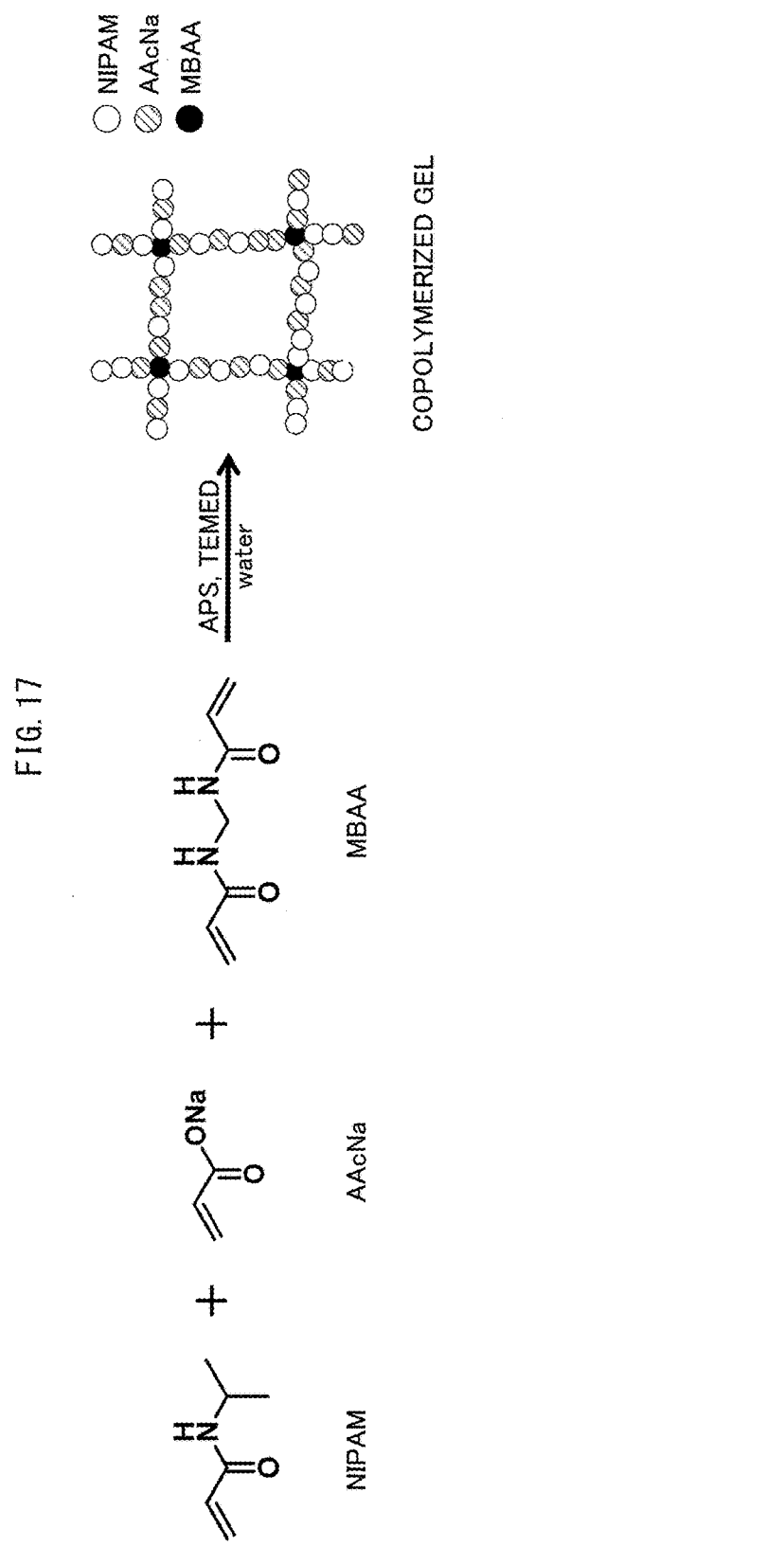
FIG. 17 is a view illustrating (i) a copolymerized gel synthesized in Comparative Example of the present invention and (ii) a method of producing the copolymerized gel.

Synthesis of Copolymerized Gel of N-Isopropyl Acrylamide and Sodium Acrylate 538.6 mg of N-isopropyl acrylamide (NIPAM), 191.8 mg of sodium acrylate (AAcNa), and 77.8 mg of methylenebisacrylamide (MBAA) were dissolved in 3.4 mL of pure water. To a resultant solution, 1 mL of N,N,N',N'-tetramethylethylene diamine (TEMED) at 0.8 mol/L and 1 mL of ammonium persulfate (APS) at 0.4 mol/L were added. Then, a resultant mixture was reacted in an ice bath for 6 hours, so that a hydrogel, which had an AAcNa content (hereinafter abbreviated as "AAc content") of 30 mol % and which was constituted by a random copolymer of N-isopropyl acrylamide and sodium acrylate, was synthesized (such a hydrogel will be hereinafter abbreviated as "PNIPAM/PAAcNa copolymerized gel"). FIG. 17 illustrates the copolymerized gel thus synthesized and a method of producing the copolymerized gel.

By changing a ratio between N-isopropyl acrylamide (NIPAM) and sodium acrylate (AAcNa), PNIPAM/PAAcNa copolymerized gels having AAc contents of 2.5 mol %, 5 mol %, 10 mol % and 30 mol % were likewise produced.

<Phase Transition Behavior of PNIPAM/PAAcNa Copolymerized Gel>

PNIPAM/PAAcNa copolymerized gels were obtained as in Example 1 except that the measurement temperature was changed to 20° C., 25° C., 30° C., 35° C., 40° C., 50° C. and 60° C. The PNIPAM/PAAcNa copolymerized gels thus obtained were each immersed in pure water. Then, respective water contents of the PNIPAM/PAAcNa copolymerized gels after being allowed to stand for 24 hours at a constant temperature were calculated. Then, a phase transition behavior of the PNIPAM/PAAcNa copolymerized gels along with a temperature change was studied.

Figure 18:
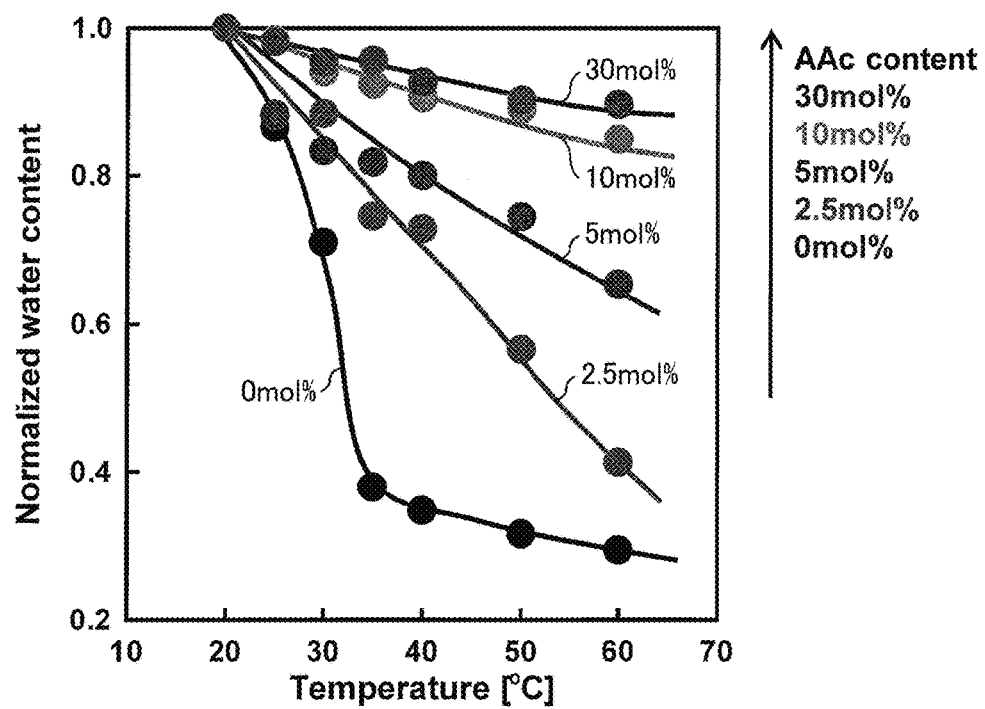
FIG. 18 is a view showing results of evaluation of a phase transition behavior of a copolymerized gel along with a temperature change in Comparative Example of the present invention.

FIG. 18 shows the results of studying the phase transition behavior. In FIG. 18, (i) the vertical axis indicates water content (shown as "Normalized water content" in FIG. 18) normalized such that a water content at 20° C. is 1 and (ii) the horizontal axis indicates temperature (Unit: ° C.). As indicated by FIG. 18, the water contents of the PNIPAM/PAAcNa copolymerized gels were continuously changing, and no temperature at which the water contents largely changed was observed. It is also indicated that with the PNIPAM/PAAcNa copolymerized gels, an increase in AAc content, that is, an increase in the rate of a hydrophilic polymer resulted in a decrease in property of changing from being hydrophilic to being hydrophobic in response to temperature.

EXAMPLE 2

Synthesis of Polymer Gel in which Semi-Interpenetrating Polymer Network Structure is Formed by Alginic Acid and Hydroxypropyl Cellulose (Hereinafter Also Abbreviated as "HPC")

700 mg of hydroxypropyl cellulose (Wako Pure Chemical Industries, Ltd.; hydroxypropyl cellulose 150-400 cP) and 700 mg of sodium alginate were dissolved in 25 mL of pure water. Into a resultant solution, 100 mL of calcium chloride solution at 0.5 mol/L was poured, and a resultant mixture was allowed to stand for 2 days, so that a polymer gel, in which a semi-interpenetrating polymer network structure was formed by hydroxypropyl cellulose and alginic acid, was prepared (such a polymer gel will be hereinafter also abbreviated as "HPC/Alg semi-IPN gel").

<Moisture Absorption Behavior of HPC/Alg Semi-IPN Gel>

The HPC/Alg semi-IPN gel obtained was frozen at −30° C., and was dried at a reduced pressure of 20 Pa for 24 hours. By allowing a dried product of the obtained HPC/Alg semi-IPN gel to stand at a constant temperature of 25° C. and a constant humidity of 80% RH, and measuring changes in weight over time, moisture absorption behavior of the dried product of the HPC/Alg semi-IPN gel was studied.

Figure 19:
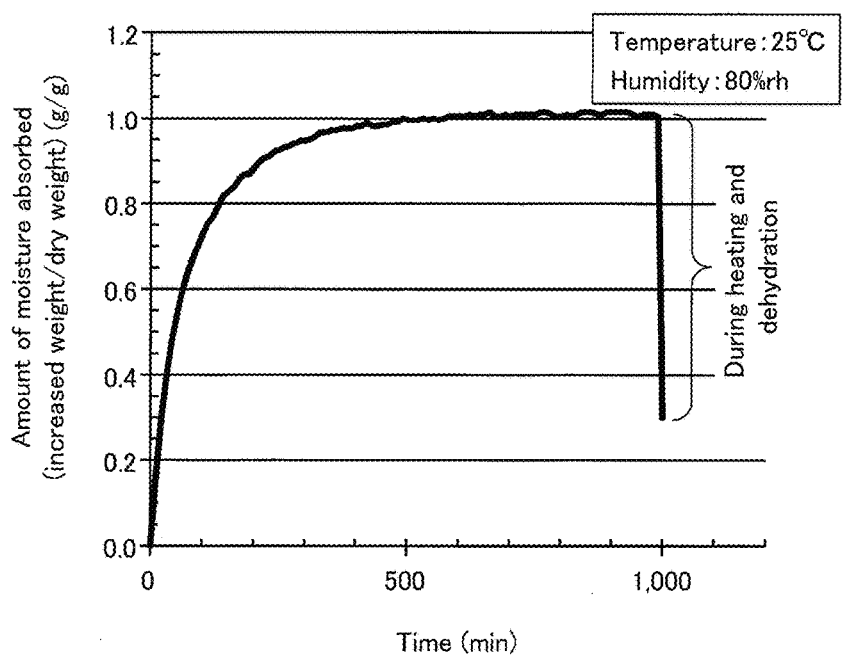
FIG. 19 is a view showing results of evaluation of a moisture absorption behavior of the moisture absorbing material in Example of the present invention.

FIG. 19 shows the results of studying the moisture absorption behavior. In FIG. 19, (i) the vertical axis indicates water content (shown as "AMOUNT OF MOISTURE ABSORBED" in FIG. 19. The water content, in other words, the amount of absorbed moisture. Unit: g/g) and (ii) the horizontal axis indicates time (Unit: min). The water content refers to a value obtained by dividing (a) a weight increased by moisture absorption (increased weight) by (b) a weight of a dried product (dry weight). As illustrated in FIG. 19, a dried HPC/Alg semi-IPN gel had high moisture absorption performance.

FIG. 19 also shows a water content after (i) the dried product of the HPC/Alg semi-IPN gel was allowed to stand for 1000 minutes at a constant temperature of 25° C. and a constant humidity of 80% RH, (ii) the dried product was heated at 60° C. with the use of a plate-like heater, and then (iii) moisture, which seeped out, was removed with the use of a sheet of filter paper (shown as "DURING HEATING AND DEHYDRATION" in FIG. 19).

<Dehydration Behavior of Dried Product of HPC/Alg Semi-IPN Gel>

The dried product of the HPC/Alg semi-IPN gel was allowed to stand for 24 hours at a constant temperature of 25° C. and a constant humidity of approximately 80% RH, so that the dried product sufficiently absorbed moisture. The dried product of the HPC/Alg semi-IPN gel, which had thus absorbed moisture, was heated with the use of a heater at 60° C. A surface of the gel was video recorded, and the dehydration behavior was studied.

Figure 20:
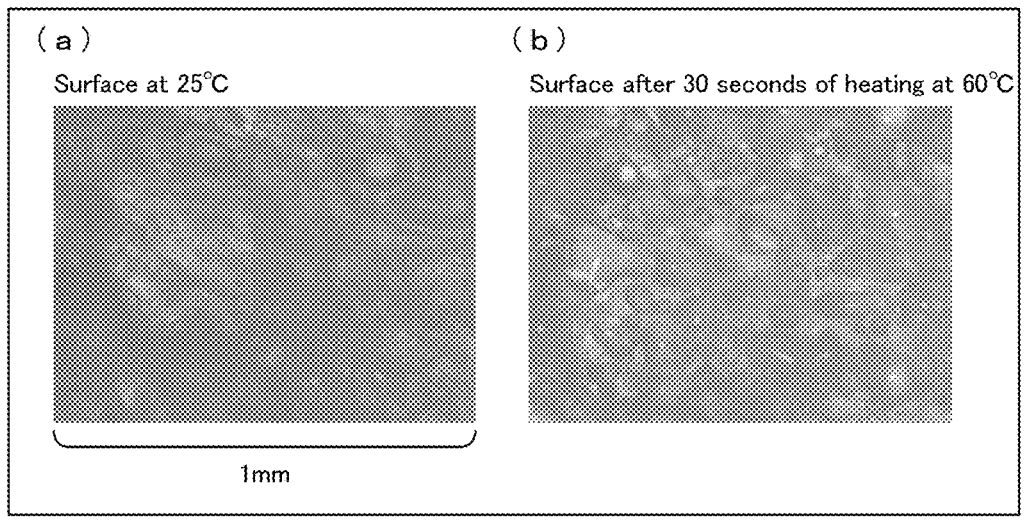
FIG. 20 is a view showing results of evaluation of a dehydration behavior of the moisture absorbing material in Example of the present invention.

FIG. 20 shows the results of studying the dehydration behavior. (a) of FIG. 20 shows a surface of the dried product of the HPC/Alg semi-IPN gel, which surface had absorbed moisture before the heating. (b) of FIG. 20 shows the surface of the dried product of the HPC/Alg semi-IPN gel 30 seconds after the heating. FIG. 20 indicates that application of heat of 60° C. caused moisture, which had been absorbed into the dried product of the HPC/Alg semi-IPN gel, to seep out in liquid form from the dried product.

EXAMPLE 3

A polymer gel, in which a semi-interpenetrating polymer network structure was formed by alginic acid and HPC, was produced and evaluated as in Example 2 except that hydroxypropyl cellulose 6.0-10.0 (Wako Pure Chemical Industries, Ltd.) was used as HPC. It was observed that a dried product of the polymer gel had high moisture absorption performance and high dehydration performance.

EXAMPLE 4

A polymer gel, in which a semi-interpenetrating polymer network structure was formed by alginic acid and HPC, was produced and evaluated as in Example 2 except that hydroxypropyl cellulose 1000-5000 cP (Wako Pure Chemical Industries, Ltd.) was used as HPC. It was observed that a dried product of the polymer gel had high moisture absorption performance and high dehydration performance.

INDUSTRIAL APPLICABILITY

With a moisture absorbing material in accordance with an embodiment of the present invention, absorbed moisture can be directly extracted in liquid form by application of a stimulus. In a case where the moisture absorbing material is used as a dehumidifying material, therefore, it is possible to efficiently carry out dehumidification without supercooling or large heat quantity.

Hence, the moisture absorbing material in accordance with an embodiment of the present invention is extremely useful as a dehumidifying material, and is therefore suitable for use in a dehumidifier.

REFERENCE SIGNS LIST

1 Moisture absorbing unit
2 Base material (water collecting part)
3 Water absorbing groove
4 Drip opening
5 Heater (stimulus applying section)
6 Heater electrode
7 Moisture absorbing material
8 Dehumidifier main body
9 Air inlet
10 Air outlet
11 Air blowing fan
12 Unit rotating motor
13 Unit rotation axis
14 Water drain tank
15 Heater-specific fixed electrode
16 Moisture absorption region
17 Dehydration region
18 Absorbed air (moist air)
19 Discharged air (dry air)

The invention claimed is:

1. A moisture absorbing material comprising:
   a dried product of a polymer gel,
   the polymer gel including
      a stimuli-responsive polymer whose affinity with water changes reversibly in response to an external stimulus and
      a hydrophilic polymer, and
   the stimuli-responsive polymer and the hydrophilic polymer forming an interpenetrating polymer network structure or a semi-interpenetrating polymer network structure.

2. The moisture absorbing material as set forth in claim 1, wherein
   the external stimulus is heat, light, an electrical field, or pH.

3. The moisture absorbing material as set forth in claim 1, wherein
the stimuli-responsive polymer is (i) at least one polymer selected from the group consisting of: poly(N-alkyl (meth)acrylamide); poly(N-vinylalkylamide); poly(N-vinylalkylamide); poly(2-alkyl-2-oxazoline); polyvinyl alkyl ether; a copolymer of a polyethylene oxide and a polypropylene oxide; poly(oxyethylene vinyl ether); a cellulose derivative; and a copolymer of these or (ii) a product obtained by crosslinking the at least one polymer.

4. The moisture absorbing material as set forth in claim 1, wherein
the hydrophilic polymer is (i) at least one polymer selected from the group consisting of: alginic acid; hyaluronic acid; chitosan; a cellulose derivative; poly(meth)acrylic acid; polyethylene glycol; and a copolymer of these or (ii) a product obtained by crosslinking the at least one polymer.

5. A dehumidifier comprising:
a moisture absorbing material recited in claim 1; and
a stimulus applying structure that applies an external stimulus including one of heat, ultraviolet radiation, visible light, infrared radiation, and an electric field to the moisture absorbing material.

6. A dehumidifier as set forth in claim 5, further comprising:
a water collecting portion that is a base material including water absorbing grooves and is provided to be in contact with the moisture absorbing material and which collects water that has seeped from the moisture absorbing material in response to application of a stimulus.

7. The dehumidifier as set forth in claim 6, wherein
the water collecting portion has, on a surface thereof, water absorbing grooves, which surface is in contact with the moisture absorbing material.

* * * * *